United States Patent
Losch

(10) Patent No.: US 11,866,668 B2
(45) Date of Patent: Jan. 9, 2024

(54) METHOD AND SYSTEM FOR MANAGING VARIABLE, MULTI-PHASE FLUID CONVERSION TO OUTPUT FUEL AND ENERGY

(71) Applicant: Kenneth Losch, Phoenix, AZ (US)

(72) Inventor: Kenneth Losch, Phoenix, AZ (US)

(*) Notice: Subject to any disclaimer, the term of this patent is extended or adjusted under 35 U.S.C. 154(b) by 0 days.

(21) Appl. No.: 17/924,476

(22) PCT Filed: May 19, 2021

(86) PCT No.: PCT/US2021/033213
§ 371 (c)(1),
(2) Date: Nov. 10, 2022

(87) PCT Pub. No.: WO2021/236803
PCT Pub. Date: Nov. 25, 2021

(65) Prior Publication Data
US 2023/0135126 A1 May 4, 2023

Related U.S. Application Data

(60) Provisional application No. 63/027,070, filed on May 19, 2020.

(51) Int. Cl.
*C10L 3/12* (2006.01)
*B01J 19/24* (2006.01)
(Continued)

(52) U.S. Cl.
CPC .............. *C10L 3/12* (2013.01); *B01J 19/246* (2013.01); *C10L 3/103* (2013.01); *C10L 3/104* (2013.01);
(Continued)

(58) Field of Classification Search
CPC .... C10L 3/12; C10L 2290/08; C10L 2290/24; C10L 2290/58; B01J 19/246
See application file for complete search history.

(56) References Cited

U.S. PATENT DOCUMENTS

| 8,122,718 B2 | 2/2012 | McBride et al. |
| 8,457,800 B2 | 6/2013 | Marcus |

(Continued)

OTHER PUBLICATIONS

International Search Report from International Application No. PCT/US2021/033213; dated Aug. 24, 2021.

*Primary Examiner* — Ellen M McAvoy
*Assistant Examiner* — Ming Cheung Po
(74) *Attorney, Agent, or Firm* — Morse, Barnes-Brown & Pendleton, P.C.; Sean D. Detweiler, Esq.

(57) ABSTRACT

A method, system, and apparatus for managing variable, multi-phase fluid conversion to output fuel and energy for providing customizable management for processing a volume of natural gas including a volume of methane and a volume of other alkanes that may be cleaned of the other alkanes using a conversion system to create synthesis gas and other fuel products to be used in onsite or combined heat and power or cogeneration applications. In particular, the method, system, and apparatus provide for automated feedback and control directing various gas constituents to different application units with allocations according to settings system parameters to quickly and efficiently meet the demand for various products while making adjustments in real-time.

54 Claims, 3 Drawing Sheets

(51) Int. Cl.
*C10L 3/10* (2006.01)
*B01D 53/00* (2006.01)
*B01D 53/14* (2006.01)

(52) U.S. Cl.
CPC ............ *C10L 3/105* (2013.01); *C10L 3/106* (2013.01); *B01D 53/002* (2013.01); *B01D 53/1468* (2013.01); *B01D 53/1487* (2013.01); *C10L 2290/08* (2013.01); *C10L 2290/24* (2013.01); *C10L 2290/58* (2013.01); *C10L 2290/60* (2013.01)

(56) References Cited

U.S. PATENT DOCUMENTS

| | | | |
|---|---|---|---|
| 2001/0011556 A1* | 8/2001 | Butler | F17D 1/005 137/565.29 |
| 2012/0161451 A1 | 6/2012 | Struble et al. | |
| 2017/0129833 A1 | 5/2017 | Hassan et al. | |

* cited by examiner

METHOD AND SYSTEM FOR MANAGING VARIABLE, MULTI-PHASE FLUID CONVERSION TO OUTPUT FUEL AND ENERGY

CROSS-REFERENCE TO RELATED APPLICATIONS

This application is a national stage filing under 35 U.S.C. 371 of International Application No. PCT/US2021/033213, filed May 19, 2021, which claims priority to, and the benefit of, co-pending U.S. Provisional Application No. 63/027,070 filed May 19, 2020 for all subject matter contained in said applications. The entire teachings of said applications are incorporated by reference herein. International Application No. PCT/US2021/033213, was published under PCT Article 21(2) in English.

FIELD OF THE INVENTION

The present invention relates to a methods and apparatus for converting natural gas with heavier hydrocarbon gas content at remote locations dynamically into a set of useful products including pipeline quality natural gas and blended gas products to power application units such as multi-fuel micro-turbines. It provides a method and apparatus for managing variable, multi-phase fluid conversion to output fuel and energy for providing customizable management for processing a volume of natural gas including a volume of methane and a volume of other alkanes that may be cleaned of the other alkanes using a conversion system to create gas and other fuel products to be used in onsite or combined heat and power or cogeneration applications. In particular, the method, system and apparatus provide for automated feedback and control directing various gas constituents to different application units with allocations according to settings system parameters to quickly and efficiently meet demand for various products while making adjustments in real time.

BACKGROUND

Generally, oil wells often have an amount of natural gas associated (also referred to herein as "associated gas" and "flare gas") with them. Crude oil and natural gas are extracted from the oil wells together and the natural gas and crude oil must be separated. In remote areas with insufficient infrastructure or where the economics present a challenge, this associated gas may be flared. The flaring process causes carbon dioxide and volatile organic compound emissions and is being targeted for removal for environmental protection reasons.

Natural gas associated with oil wells can be high in alkanes other than methane (C1), such as ethane (C2), propane (C3) and butane (C4). These higher carbon number alkanes are of high caloric value and, in some embodiments, may allow for transport of the energy in the form of a highly dense liquid referred to as natural gas liquids ("NGLs"). Though these other alkanes are often used as fuel in other industries, technological limitations on their separation and handling with regard to associated gases unfortunately results in these constituent gases being wasted and often harmfully introduced into the greater environment.

Remote processing of natural gas to remove the "NGLs" or convert the entire stream to liquids has attracted great attention. The two leading processes in this industry are basic membrane separation and gas to liquid conversion (Joule-Thomson or cryogenic separation) with drier gas high in methane and a nonmethane stream. Both processes are energy intensive and typically require onsite electrical power generation.

Membrane separation pressurizes the stream to high pressures (1000+PSI) and forces the gas through membrane sieves which force the liquids to condense and allow the liquids to be removed. Membrane separation is unable typically to remove ethane because its size is relatively close to methane. The resulting natural gas from membrane separation is not of pipeline quality because of its ethane content.

These two technologies, however, are not well suited for removal and transport of natural gas streams at well sites. The technologies are very energy intensive and require onsite electrical power to be utilized. Oil well sites including remote oil well sites have electrical demands that currently are fed by expensive grid power, high emission inefficient natural gas generators and expensive local diesel generators. Where the gas extracted from the oil well is of a high enough quality, natural gas generators ("genset") are used. Well sites prefer to use the gas from the nearby well because it is a byproduct of oil removal. Currently available and utilized natural gas generators require near pipeline quality natural gas in order to function optimally. Often, extracted natural gas is not of sufficient quality or are high in alkanes other than methane required by most power generating units available. Power generating units can only use fuel with specific heat values and cannot function outside of those ranges. Even newer turbines that accept a greater range of fuel with additional non-methane components still require essentially standard mixtures and cannot adapt well to time-varying composition of aggregate gases and must shut down if fuel gas exceeds specification limits. Most combined heat and power or cogeneration systems and components cannot operate efficiently on extracted associated gases, especially because there is great variation and fluctuation in the associated gas flow at any given point in time due to natural occurring factors and issues including maintenance or shut down of various wells that effects the composition of the associated gas stream. One result is that power units are often run at capacities that do not meet onsite demand despite being capable of doing so, because the inefficient processes require the entire associated gas flow to be processed even when it may meet quality parameters for certain power units at certain times, and require time consuming processes for e.g. separating NGLs from higher quality methane gases that reduce the gas that can be used as fuel and often result in significant NGLs that still need to be transported away or flared, resulting in losses in production volume and value generation.

Additionally, many systems can only treat the entire associated gas supply before sending to turbines or other application units, even though gas supply may be of high quality at various points in extraction. This means that already viable gas mixtures that can serve immediately as fuel are still put through conversion processes instead of being used directly (where wells known in the industry generally have associated gas or flare gas mixtures that may range from 30% to 90% methane content and commonly range from 65% to 80% methane content). For example, 90% methane does not need to be separated after conditioning processes are performed and can be efficiently converted into products to be used effectively to power equipment. The delay and cost of separating all gas including gas of already-sufficient quality is a significant drawback to existing systems. Bottlenecks and delays as well as insufficient processing losing portions of gas due to friction, leakage, heat loss and other system inefficiencies make existing systems and methods unattractive alternatives for many parties seeking effective gas conversion to other usable resources that will help in operating plants or generating additional revenue from existing treatment streams.

Combined heating and power or cogeneration applications for using well byproducts generally have a varying set of applications that require differing amounts of distinct products over time based on particular uses facilities or customers thereof. Variable inputs and outputs throughout the process occur due to equipment maintenance, component failure or breakdown, and natural occurrences that mean different subsets of wells are in operation over time, in turn providing different capacities and differing shortcomings that need to be addressed and corrected by a system. Systems known in the art include turbines and other components that have narrow operating parameters for fuel and even multi-fuel turbines would require frequent shutdowns if part of a direct line of components connected in series, remain shut down until thresholds are no longer exceeded and would require certain restart procedures. Many systems currently running do so at far less than full capacity or optimal operating parameters due to such limitations in associated gas processing and use.

As an over-simplified example, if a source of associated gas included three active wells supplying input gas, each may be of different composition of methane and higher carbon alkanes. If Well A is 90% methane, well B is 80% methane and Well C is 70% methane, a certain subset of well combination inputs would be within threshold parameters to operate a multi-fuel turbine requiring at least 80% methane, and other subsets would not be usable or would result in equipment shutting itself down due to heat in excess of operating thresholds. In the case where each well contributes approximately the same volume of gas and gas from each well is periodically unavailable due to maintenance operations, well A alone, well B alone, and well A and well B together, well A and well C together, and well A with well B with well C would be acceptable combinations of gas to fuel the turbine, but well C alone, and well B and well C would be unacceptable combinations of gas to send directly to the multi-fuel turbine.

In short, current associated gas converting technologies lack sufficient ability to adjust to a variety of associated gas compositions, are too inefficient in the manner they process those gases, and possess limitations that result in the needless flaring or waste of an extensive amount of components or constituents of those gases that have economic value and could be put to productive use while reducing negative environmental externalities.

SUMMARY

There is a need for multi-phase fluid conversion to output fuel and energy for providing customizable management for processing a volume of natural gas that is commonly extracted in aggregated form including a volume of methane and a volume of other alkanes that may be selectively conditioned, separated, and blended into a variety of different products that more efficiently uses a larger percentage of the constituents of the natural gas without over-processing those constituents or inefficiently flaring off large quantities of those constituents, in order to fuel onsite and offsite applications including combined heating and power or cogeneration applications in a responsive and dynamic manner that adapts to changing fuel demands and changing natural gas source content. The present invention is directed toward further solutions to address this need, in addition to having other desirable characteristics. Specifically, the present invention relates to a system and a method for managing variable, multi-phase fluid conversion to output fuel and energy for providing customizable management for processing a volume of natural gas including a volume of methane and a volume of other alkanes to create fuel products to be used in onsite or combined heat and power or cogeneration applications. In particular, the method, system and apparatus provide for automated feedback and control directing various gas constituents to different application units with allocations according to settings system parameters to quickly and efficiently meet demand for various products while making adjustments in real time. The method, system and apparatus of the present invention automatically adjusts to varying inputs—rerouting products, intermediate products and by products based on need, operating conditions and input composition. In this way the converting system does not have to shut off if operating parameters exceeded. It merely adjusts system flows to the correct configuration and continues processing. It therefore continues to provide products, e.g. it provides immediate power, including to power onsite systems, without reductions in capacity or bottlenecks associated with keeping certain components operating within parameters, thereby freeing more power to be transmitted and more products to be delivered. The system and method increases the quantity of products output, the range of different products output, output ratios. In example embodiments, more or less flow can be directly used a set of turbines; more or less flow can be allocated to various subprocesses; more or less flow can be converted and/or produced as dry gas; more or less flow can be diverted to natural gas liquid (NGL) conduits or wastegates for recombination into additional value-added products; NGLs can be further converted to multifuel applications or transported for external use rather than flared off; and addition power generation can occur on site. Power supply and/or flow demand do not suffer bottlenecks or reduced capacity.

In accordance with aspects of the present invention, the system and method controls, inter alia, the flow rate and constituent ratio of all subsystems and products thereof to convert associated gas (also referred to herein as "flare gas") into a number of products gas by receiving a volume of flare gas or associated gas, where the volume of flare gas or associated gas includes a volume of methane (C1) and a volume of other alkanes (C2, C3, C4, etc.). The method can control both an inlet flow of the volume of flare gas and a volume of other liquids, gases that will convert, or change at least a portion of the volume of heavier (C2+) alkanes from the volume of flare gas. The method may then further process this gas or liquid to convert it to a methane rich process gas which may be combined with Flare gas to form an enriched product gas with a specific caloric value and methane number. The method can also detect when flare gas or associated gas is of sufficient quality to be used directly in applications such as turbines for power generation, and route that gas directly to those applications units that can successfully receive them. The method also uses removed constituents from gas conditioning processes and NGLs to reformulate additional product gases (blended gases) that can be used for additional applications with lower requirements or be transported for off-site use (where these gases are still of sufficient quality to be used economically rather than flared off due to transport cost exceeding the value of the underlying gas product). In accordance with aspects of the invention, the system and method provides an improved ability to adjust, redistribute, and even switch products, while also providing improved safety and reliability through redundancy and flexibility of system components, parameters, and controls. Having more product options and more routing options along with smaller, more diverse product production points also makes it less likely that the gases will have to be flared, causing negative outcomes for the environment and losing the ability to derive revenue from those resources. In this way the input gas does not all have to be converted and lower quality gases can be redirected, and the conversion system never has to be shut down due to danger of operating outside parameters and/or thresholds, because it can be adjusted according to primary purpose or need for one or more of the at least three product classes. This method multiplies uses system products and the volume of gases used before resorting to flaring unusable/waste gases, improving efficiency, production and the environment.

Those of skill in the art will understand that the system is capable of scaling, including by configuring subsystems and components to comprise a greater number of alternative specialized applications for routing gas and products to, as well as a greater number of intermediate steps, stages or products created as gas is converted and transported through the system during processing.

Unit design allows the system to convert methane and non-methane hydrocarbon alkanes (C2+) of any composition (e.g. ethane, propane and butane), including inter alia ranges from 100% ethane or nonmethane components to 100% methane, into usable products including methane rich product gas (dry gas) streams suitably for use in gas pipelines and lower methane content products including blended gas used to power e.g. combined heating and power applications onsite for a client. The system is modular, scalable and may be remotely monitored and controlled. This on-demand system produces gas of different types only as required or demanded by the applications. In an example embodiment of genset, as genset load increases or decreases the system can increase or decrease gas production based on changes in at least one of several parameters (e.g., genset feed gas pressure and/or flow rate). In an example embodiment of onsite power generation, as power demand increases the system can increase production of those gases used to fuel the appropriate application units (e.g. turbines connected to generators), while reducing flows to other production components (such that e.g. produced dry gas of pipeline quality is reduced). Process temperature control through a variety of temperature control devices and thermal energy management subsystems allows a variety of fluid heat exchangers to be used to control process cooling or flow regulating, where regulation of flow itself to different sets of subsystems or application units can be used to improve or correct system performance in relation to changing environmental and operating conditions including dynamic temperature changes. Thermal management subsystems include recuperative heating/cooling that may be used throughout system to increase energy efficiency and unit control. Throughout the system input and output streams may be used for energy exchange.

System product gas control and or enrichment control allow the system to perform measurement of Flare gas quality parameters including caloric value and/or Methane Number and/or composition can be used to control the gas stream to carbon ratio of the various gases (including input gas, conditioned gas, dry gas, blended gas, converted gas, and other product gases and liquids), component temperatures, and product gas quality ("Enrichment"). Conditioning and removal subsystems allow the system to perform automated generating and dispensing or rerouting of removed constituents. Components and operations or conditions thereof can be tracked where the system can monitor performance and/or monitor midstream non-methane hydrocarbon composition. Software and/or one or more control subsystems allow the conversion system to perform proportional control of product gas enrichment, thermal management subsystems, safeguards, startup/shutdown and redirect operations in process, transient/upset/spike response, warning systems, smart systems for various system configurations and embodiments including, but not limited to, the fully integrated J-T adapted system (discussed below).

In accordance with example embodiments of the present invention, a method for managing variable, multi-phase fluid conversion to output fuel and energy, the method comprises a gas conditioning subsystem that receives a flow of input gas from a gas source input gas stream of varying composition comprising methane and non-methane hydrocarbons with the gas conditioning subsystem converting the input gas into conditioned gas, with a compressor subsystem adjusting pressure of the conditioned gas; and a conversion system control subsystem that comprises multiple automatically controlled closed loops managed by the control subsystem to direct fluids and/or gas flow, further comprising a first closed loop wherein a first controller adjusts system parameters to vary conditioned gas flow based on measurements by the at least one measurement component. The method further comprises a first blending subsystem receiving and directing the conditioned gas into one or more pre-separation application units and/or a separation subsystem, and a second controller in communication with at least one feedback component positioned at or before a gas inlet for the one or more pre-separation gas application units to form a second closed loop of the control subsystem, wherein the second controller adjusts system parameters to vary conditioned gas flow based on measurements by the at least one feedback component.

The method further comprises a separation subsystem comprising a Joule-Thomson (JT) apparatus in fluid communication with the first blending subsystem, that receives a conditioned gas stream and separating at least a portion of the conditioned gas using a thermal management subsystem and Joule-Thompson effect to condense heavier hydrocarbons out of the conditioned gas stream, to produce (a) a condensed liquid comprising primarily non-methane hydrocarbons, and (b) a dry gas comprising primarily methane and lessor amounts of non-methane hydrocarbons.

The method further comprises a dry produced gas subsystem in fluid communication with the separation subsystem, directing dry gas to one or more dry gas application units using a third controller in communication with a monitoring component positioned at or before a fuel gas inlet for the one or more dry gas application units to form a third closed loop of the control subsystem, wherein the third controller adjusts system parameters to vary dry gas flow in real-time, on-demand, based on measurements by the at least one monitoring component.

The method further comprises a second blending subsystem in fluid communication with the dry gas subsystem controlling production of blended gas to match fuel flow demand of one or more wet gas application units by adjusting the flow rate of a dry gas stream through one or more mixing valve subsystems and/or waste gates to control production rate of the blended gas comprising converted gas from the condensed liquid mixed with the dry gas stream within threshold limits of a predetermined enrichment ratio.

The method further comprises a natural gas liquid (NGL) and wet gas subsystem in fluid communication with the separation subsystem and the second blending subsystem, directing blended gas to the one or more wet gas application units using a fourth controller in communication with a sensing component, wherein the fourth controller adjusts system parameters to vary blended gas flow in real-time, on-demand, based on measurements by the at least one sensing component.

The method further comprises an application unit product subsystem receiving unit products and delivering unit products to output destinations according to system parameters, wherein the control subsystem automatically controls flow and directs fluids/gases in real time using valves and components to meet one or more of: flow demand, predetermined thresholds, predetermined specifications, and predetermined system parameters.

In accordance with aspects of the present invention, the input gas can be associated gas and the associated gas stream can contain methane and non-methane hydrocarbons.

In accordance with aspects of the present invention, the gas conditioning subsystem can comprise one or more conditioning components performing one or more conditioning operations comprising one or more of: additional gas compression or pressure adjustment, hydrogen sulfide ($H_2S$) removal, nitrogen separation, carbon dioxide ($CO_2$) removal or water removal pressure $CO_2$ LNG hydrogen, wherein removed constituents comprising one or more of $H_2S$, nitrogen $CO_2$, or water are diverted for further storage or processing. The portions of removed constituents and conditioned gas of the first blending subsystem can be selectively added or blended back into gas streams supplying one or more of the one or more dry gas application units, the one or more wet gas application units, or the one or more pre-separation gas application units, using valves and components to meet one or more of: flow demand, predetermined thresholds, predetermined specifications, and predetermined system parameters.

In accordance with aspects of the present invention, the first blending subsystem can receive the conditioned gas from the gas conditioning system in fluid communication with the first blending subsystem and increase or decrease conditioned gas flow to manage heat range and gas constituents/ratios according to predetermined unit specifications, using a diverting valve subsystem to control flow and divert gas unusable or excess of unit specifications to the separation subsystem. The second controller of the first blending subsystem can adjust system parameters to vary conditioned gas flow based on measurements by the at least one feedback component according to one or more of: fuel flow demand of the one or more pre-separation gas application units, measured pressure of the conditioned gas, heat range and/or heating value of a gas stream of the one or more pre-separation gas application units, or constituent composition of the conditioned gas, conducted in real-time, on-demand, based on measurements by the at least one feedback component. The at least one feedback component of the first blending subsystem can comprise at least one of a pressure sensor, a gas flow meter, a flame ionization detector (FID), an infrared composition sensor, gas chromatography instrument, or a non-methane hydrocarbon detector disposed in a fluid circuit, used to measure heating value of at least the conditioned gas.

In accordance with aspects of the present invention, the dry produced gas subsystem third controller can adjust system parameters and flow rate according to one or more of: fuel flow demand of the one or more dry gas application units, measured pressure of the dry gas, heat range and/or heating value of a gas stream of the one or more dry gas application units, or gas constituent composition of the dry gas, conducted in real-time, on-demand, based on measurements by the at least one monitoring component. The at least one monitoring component of the dry produced gas subsystem comprises at least one of a pressure sensor, a gas flow meter, a flame ionization detector (FID), an infrared composition sensor, gas chromatography instrument, or a non-methane hydrocarbon detector disposed in a fluid circuit, used to measure heating value of at least the dry gas.

In accordance with aspects of the present invention, the condensed liquid stream can be vaporized using a vaporizing apparatus configured to receive the condensed liquid and convert the condensed liquid to gaseous form converted gas prior to entering the second blending subsystem or receiving dry gas supply at the mixing valve subsystem. Inside the second blending subsystem the dry gas stream, comprising a portion of the dry gas diverted from being delivered to the one or more dry gas application units, can be mixed with one or more of NGLs, condensed liquid in gaseous form or converted gas.

In accordance with aspects of the present invention, the system can further comprise routing the conditioned gas flowing through a dehydrator to remove water or other liquids from the conditioned gas to form a conditioned gas suitable for compression. A carbon dioxide removal apparatus can be capable of substantially removing carbon dioxide from the conditioned gas to form a conditioned gas, wherein the carbon dioxide removal apparatus can be in fluid communication with, and disposed before the one or more pre-separation gas application units or the compressor. A carbon dioxide removal apparatus can be capable of substantially removing carbon dioxide from the dry gas to form a treated dry gas, wherein the carbon dioxide removal apparatus can be in fluid communication with, and disposed between the separation subsystem and the one or more dry gas application units. A carbon dioxide removal apparatus can be capable of substantially removing carbon dioxide from the blended gas to form a treated blended gas, wherein the carbon dioxide removal apparatus can be in fluid communication with, and disposed between the separation subsystem or second blending subsystem mixing valves and the one or more wet gas application units.

In accordance with aspects of the present invention, a primary flow control of the control subsystem can regulate flow to one or more of: a first downstream compressor disposed before the one or more pre-separation gas application units or within lines transporting removed constituents; a second downstream compressor disposed before the one or more dry gas application units; a third downstream compressor disposed before the one or more wet gas application units or auxiliary applications; and regulation can be based on flow rate or supply of gas measured by one or more of: the at least one feedback component, the at least one monitoring component, or the at least one sensing component.

In accordance with aspects of the present invention, the NGL and wet gas subsystem fourth controller can adjust system parameters and flow rate according to one or more of: fuel flow demand of the one or more wet gas application units, measured pressure of the blended gas, heat range and/or heating value of a gas stream of the one or more wet gas application units, or gas constituent composition of the blended gas, conducted in real-time, on-demand, based on measurements by the at least one sensing component. The at least one sensing component of the NGL and wet gas subsystem can comprise at least one of a pressure sensor, a gas flow meter, a flame ionization detector (FID), an infrared composition sensor, gas chromatography instrument, or a non-methane hydrocarbon detector disposed in a fluid circuit, used to measure heating value of at least the blended gas. The control subsystem can operate a computer processor, memory, electronic communications network, control signals and an application and/or control logic that automatically controls flow and directs fluids and/or gases in real time using valves and components to meet one or more of: flow demand, predetermined thresholds, predetermined specifications, and predetermined system parameters, wherein the control signals adjust system parameters including one or more of: (1) increasing flow from the first blending subsystem to the separating subsystem; (2) decreasing flow from the first blending subsystem to the separating subsystem and increasing flow to the one or more pre-separation application units; (3) increasing flow from the second blending subsystem to natural gas liquid (NGL) and wet gas subsystem; (4) decreasing flow from the second blending subsystem to natural gas liquid (NGL) and wet gas subsystem; (5) increasing flow to one or more of: the one or more pre-separation application units, the one or more dry gas application units, or the one or more wet gas application units, in response to a decrease in pressure from a pressure sensor below a minimum pressure threshold when those application units are ramping up to meet increased power demand; (6) decreasing flow to the one or more of: the one or more pre-separation application units, the one or more dry gas application units, or the one or more wet gas application units, in response to an increase in pressure from a pressure sensor above a maximum pressure threshold when those application units are ramping down to meet decreased power demand; (7) decreasing flow to the one or more of: the one or more pre-separation application units, the one or more dry gas application units, or the one or more wet gas application units, in response to maintain pressure; (8) increasing flow to units of the application product system in response to an increase in power demand; (9) increasing/decreasing flow of the blended gas in response to the one or more application units ramping down for a decrease in power demand; and (10) increasing/decreasing flow of the blended gas in response to the one or more application units ramping down for a decrease in power demand.

In accordance with aspects of the present invention, the one or more pre-separation application units of the first blending subsystem can comprise one or more power units further comprising one or more of: turbines, micro-turbines, multi-fuel micro-turbines, reciprocating engines, gas fueled engines, compressed natural gas fueled engines configured to operate using dual fuel, compressed natural gas, or natural gas comprising methane and non-methane hydrocarbons in a predetermined composition or ratio, and the one or more pre-separation application units are operatively coupled or fastened to a generator. The one or more dry gas application units of the dry produced gas subsystem can comprise one or more power units further comprising one or more of: turbines, micro-turbines, multi-fuel micro-turbines, reciprocating engines, gas fueled engines, compressed natural gas fueled engines configured to operate using dual fuel, compressed natural gas, or natural gas comprising methane and non-methane hydrocarbons in a predetermined composition or ratio, and the one or more pre-separation application units are operatively coupled or fastened to a generator. The one or more wet gas application units of the NGL and wet gas subsystem can comprise one or more power units further comprising one or more of: turbines, micro-turbines, multi-fuel micro-turbines, reciprocating engines, gas fueled engines, compressed natural gas fueled engines configured to operate using dual fuel, compressed natural gas, or natural gas comprising methane and non-methane hydrocarbons in a predetermined composition or ratio, and the one or more pre-separation application units are operatively coupled or fastened to a generator. The NGL and wet gas subsystem can direct blended gas to one or more wet gas application units using a fourth controller in communication with a sensing component positioned at or before a fuel gas inlet for the one or more wet gas application units to form a fourth closed loop of the control subsystem, wherein the fourth controller adjusts system parameters to vary blended gas flow in real-time, on-demand, based on measurements by the at least one sensing component.

In accordance with aspects of the present invention, the application unit product subsystem can direct unit products produced by one or more of: the one or more pre-separation applications units, the one or more dry gas applications units, the one or more NGL and wet gas applications units. The application unit product subsystem can comprise a gas outlet to an NGL pipeline, flare or trailer NGL. The application unit product subsystem can comprise electrically connected to a generator, transmitting or storing produced electricity used onsite or transmitted to satisfy exterior demand. The application unit product subsystem can comprise an exhaust heat ventilation unit and conduits transmitting exhaust heat to combined heat and power applications, NGLs heat, facilities, onsite applications.

In accordance with example embodiments of the present invention, a method for managing variable, multi-phase fluid conversion to output fuel and energy comprises: a gas conditioning subsystem that receives a flow of input gas from a gas source input gas stream of varying composition comprising methane and non-methane hydrocarbons, with the gas conditioning subsystem converting the input gas into conditioned gas, with a compressor subsystem adjusting pressure of the conditioned gas; and a conversion system control subsystem comprising multiple automatically controlled closed loops managed by the control subsystem to direct fluids and/or gas flow, further comprising a first closed loop wherein a first controller adjusts system parameters to vary conditioned gas flow based on measurements by the at least one measurement component.

The method further comprises a first blending subsystem receiving and directing the conditioned gas into one or more pre-separation application units and/or a separation subsystem, and a second controller in communication with at least one feedback component positioned at or before a gas inlet for the one or more pre-separation gas application units to form a second closed loop of the control subsystem, wherein the second controller adjusts system parameters to vary conditioned gas flow based on measurements by the at least one feedback component.

The method further comprises a separation subsystem comprising a cryogenic apparatus in fluid communication with the first blending subsystem, receiving a conditioned gas stream and separating at least a portion of the conditioned gas using a thermal management subsystem and Joule-Thompson effect to condense heavier hydrocarbons out of the conditioned gas stream, to produce (a) a condensed liquid comprising primarily non-methane hydrocarbons, and (b) a converted gas comprising primarily methane and lessor amounts of non-methane hydrocarbons.

The method further comprises a dry produced gas subsystem in fluid communication with the separation subsystem, directing dry gas to one or more dry gas application units using a third controller in communication with a monitoring component positioned at or before a fuel gas inlet for the one or more dry gas application units to form a third closed loop of the control subsystem, wherein the third controller adjusts system parameters to vary dry gas flow in real-time, on-demand, based on measurements by the at least one monitoring component.

The method further comprises a second blending subsystem in fluid communication with the dry gas subsystem controlling production of blended gas to match fuel flow demand of one or more wet gas application units by adjusting the flow rate of a dry gas stream through one or more mixing valve subsystems and/or waste gates to control production rate of the blended gas comprising converted gas from the condensed liquid mixed with the dry gas stream within threshold limits of a predetermined enrichment ratio.

The method further comprises a natural gas liquid (NGL) and wet gas subsystem in fluid communication with the separation subsystem and the second blending subsystem, directing blended gas to the one or more wet gas application units using a fourth controller in communication with a sensing component, wherein the fourth controller adjusts system parameters to vary blended gas flow in real-time, on-demand, based on measurements by the at least one sensing component.

The method further comprises an application unit product subsystem receiving unit products and delivering unit products to output destinations according to system parameters, wherein the control subsystem automatically controls flow and directs fluids/gases in real time using valves and components to meet one or more of: flow demand, predetermined thresholds, predetermined specifications, and predetermined system parameters.

In accordance with example embodiments of the present invention, a method for managing variable, multi-phase fluid conversion to output fuel and energy comprises a gas conditioning subsystem receiving a flow of input gas from a gas source input gas stream of varying composition comprising methane and non-methane hydrocarbons, with a gas conditioning subsystem converting the input gas into conditioned gas, with a compressor subsystem adjusting pressure of the conditioned gas; and a conversion system control subsystem comprising multiple automatically controlled closed loops managed by the control subsystem to direct fluids and/or gas flow, further comprising a first closed loop wherein a first controller adjusts system parameters to vary conditioned gas flow based on measurements by the at least one measurement component.

The method further comprises a first blending subsystem receiving and directing the conditioned gas into one or more pre-separation application units and/or a separation subsystem, and a second controller in communication with at least one feedback component positioned at or before a gas inlet for the one or more pre-separation gas application units to form a second closed loop of the control subsystem, wherein the second controller adjusts system parameters to vary conditioned gas flow based on measurements by the at least one feedback component.

The method further comprises a separation subsystem comprising a membrane apparatus in fluid communication with the first blending subsystem, receiving a conditioned gas stream and separating at least a portion of the conditioned gas using a thermal management subsystem and Joule-Thompson effect to condense heavier hydrocarbons out of the conditioned gas stream, to produce (a) a condensed liquid comprising primarily non-methane hydrocarbons, and (b) a converted gas comprising primarily methane and lessor amounts of non-methane hydrocarbons.

The method further comprises a dry produced gas subsystem in fluid communication with the separation subsystem, directing dry gas to one or more dry gas application units using a third controller in communication with a monitoring component positioned at or before a fuel gas inlet for the one or more dry gas application units to form a third closed loop of the control subsystem, wherein the third controller adjusts system parameters to vary dry gas flow in real-time, on-demand, based on measurements by the at least one monitoring component.

The method further comprises a second blending subsystem in fluid communication with the dry gas subsystem controlling production of blended gas to match fuel flow demand of one or more wet gas application units by adjusting the flow rate of a dry gas stream through one or more mixing valve subsystems and/or waste gates to control production rate of the blended gas comprising converted gas from the condensed liquid mixed with the dry gas stream within threshold limits of a predetermined enrichment ratio.

The method further comprises a natural gas liquid (NGL) and wet gas subsystem in fluid communication with the separation subsystem and the second blending subsystem, directing blended gas to the one or more wet gas application units using a fourth controller in communication with a sensing component, wherein the fourth controller adjusts system parameters to vary blended gas flow in real-time, on-demand, based on measurements by the at least one sensing component.

The method further comprises an application unit product subsystem receiving unit products and delivering unit products to output destinations according to system parameters, wherein the control subsystem automatically controls flow and directs fluids/gases in real time using valves and components to meet one or more of: flow demand, predetermined thresholds, predetermined specifications, and predetermined system parameters.

In accordance with example embodiments of the present invention, a conversion system for managing variable, multi-phase fluid conversion to output fuel and energy, comprises: a gas conditioning subsystem receiving a flow of input gas from a gas source input gas stream of varying composition comprising methane and non-methane hydrocarbons, with conditioning components of the gas conditioning subsystem configured to convert the input gas into conditioned gas and a compressor subsystem comprising a compressor configured for adjusting pressure of the conditioned gas; and a conversion system control subsystem comprising multiple automatically controlled closed loops managed by the control subsystem to direct fluids and/or gas flow, further comprising a first closed loop wherein a first controller adjusts system parameters to vary conditioned gas flow based on measurements by the at least one measurement component.

The system further comprises a first blending subsystem in fluid communication with the conditioning subsystem, comprising a diverting valve subsystem directing the conditioned gas into one or more pre-separation application units and/or a separation subsystem, and a second controller in communication with at least one feedback component positioned at or before a gas inlet for the one or more pre-separation gas application units to form a second closed loop of the control subsystem, wherein the second controller adjusts system parameters to vary conditioned gas flow based on measurements by the at least one feedback component.

The system further comprises a separation subsystem comprising a Joule-Thomson (JT) apparatus in fluid communication with the first blending subsystem to receive a conditioned gas stream, separating at least a portion of the conditioned gas using a thermal management subsystem in fluid communication with the JT apparatus to condense heavier hydrocarbons out of the conditioned gas stream, to produce (a) a condensed liquid comprising primarily non-methane hydrocarbons, and (b) a converted gas comprising primarily methane and lessor amounts of non-methane hydrocarbons.

The system further comprises a dry produced gas subsystem in fluid communication with the separation subsystem, comprising one or more dry gas application units using a third controller in communication with a monitoring component positioned at or before a fuel gas inlet for the one or more dry gas application units to form a third closed loop of the control subsystem, wherein the third controller adjusts system parameters to vary dry gas flow in real-time, on-demand, based on measurements by the at least one monitoring component.

The system further comprises a second blending subsystem in fluid communication with the dry gas subsystem and comprising one or more mixing valve subsystems and/or waste gates controlling production rate of the blended gas comprising converted gas from the condensed liquid mixed with the dry gas stream within threshold limits of a predetermined enrichment ratio to match fuel flow demand of one or more wet gas application units by adjusting the flow rate of a dry gas stream.

The system further comprises a natural gas liquid (NGL) and wet gas subsystem in fluid communication with the separation subsystem and the second blending subsystem, directing blended gas to the one or more wet gas application units using a fourth controller in communication with a sensing component, wherein the fourth controller adjusts system parameters to vary blended gas flow in real-time, on-demand, based on measurements by the at least one sensing component.

The system further comprises a set of conduits and or pipes interconnecting subsystems in fluid communication and an application unit product subsystem receiving unit products and delivering unit products to output destinations according to system parameters, wherein the control subsystem automatically controls flow and directs fluids/gases in real time using valves and components to meet one or more of: flow demand, predetermined thresholds, predetermined specifications, and predetermined system parameters.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a method and apparatus or system for managing variable, multi-phase fluid conversion to output fuel and energy for providing customizable management for processing a volume of natural gas including a volume of methane and a volume of other alkanes that may be cleaned of the other alkanes using a conversion system to create synthesis gas and other fuel products to be used in onsite or combined heat and power or cogeneration applications. In particular, the method, system and apparatus provide for automated feedback and control directing various gas constituents to different application units with allocations according to settings system parameters to quickly and efficiently meet demand for various products while making adjustments in real time.

Figure 1:
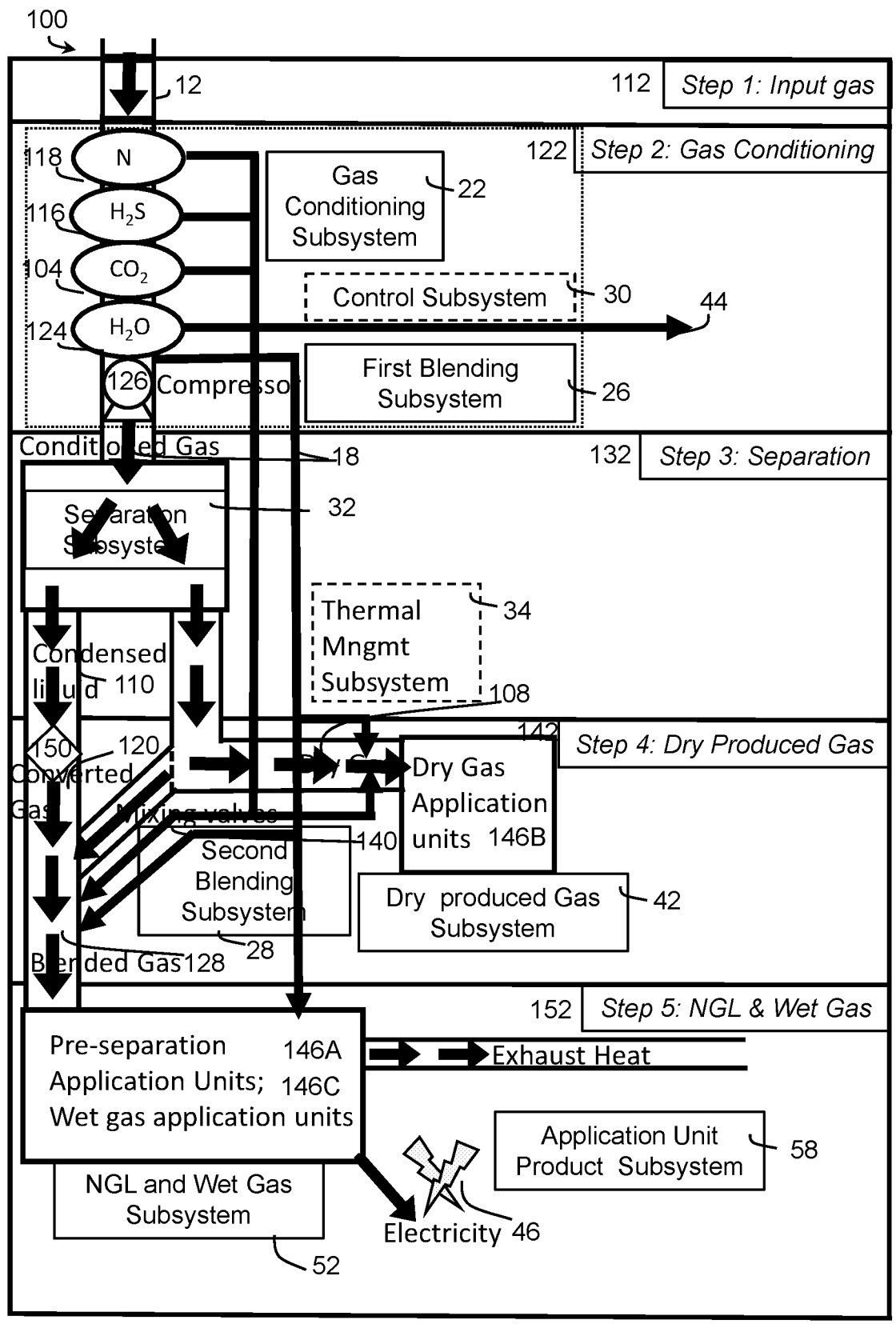
FIG. 1 is an example illustrative flowchart of the system and method variably converting input gas into multiple different gas compositions and products.
Figure 2:
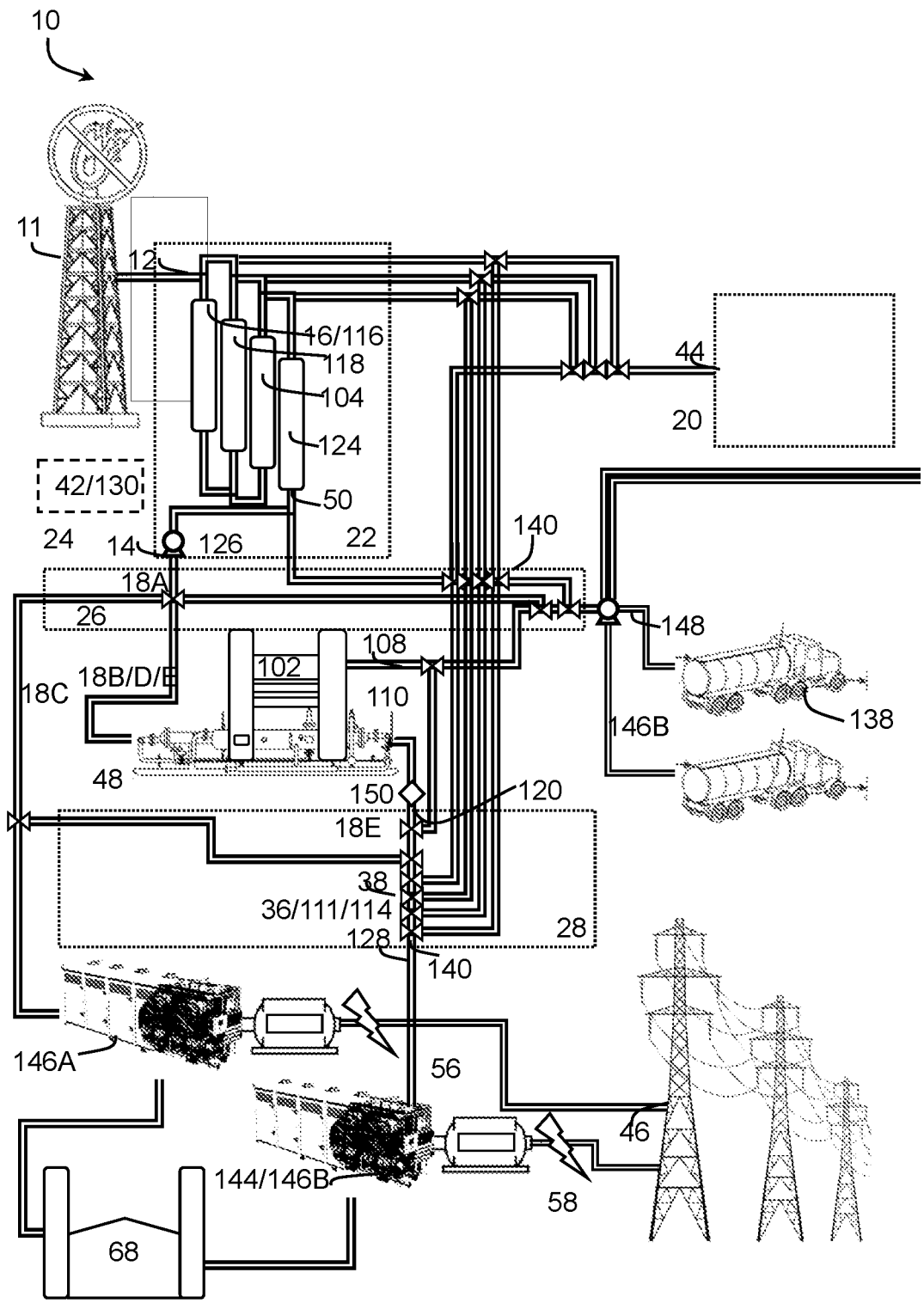
FIG. 2 is an example illustrative diagram of an alternative embodiment of the present invention adapted with a Joule-Thomson apparatus.
Figure 3:
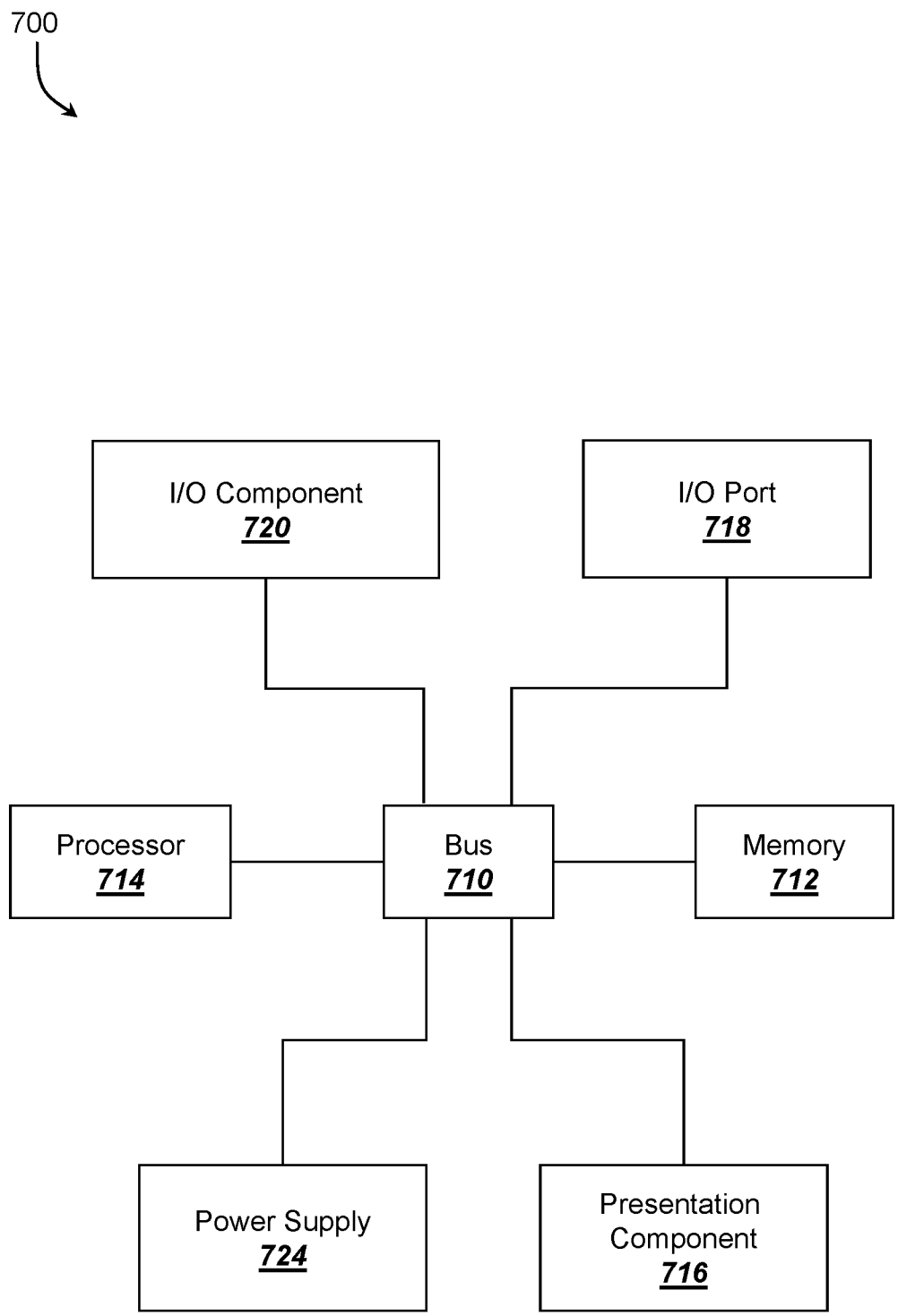
FIG. 3. is an example illustrative diagram of computing hardware used in association with the control subsystem.

FIGS. 1 through 3, wherein like parts are designated by like reference numerals throughout, illustrate an example embodiment or embodiments of multi-phase fluid conversion to output fuel and energy for providing customizable management for processing a volume of natural gas including a volume of methane and a volume of other alkanes that may be cleaned of the other alkanes and blended into a variety of products to produce various fuels or energy, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Referring now to FIG. 1, one example embodiment of the present invention includes a modular associated gas conversion system 10 with independent components or assemblies or modules (also referred to herein as "skids") that are interconnected fluidly and/or electrically (such as power; measured data collection, analysis and transmission; control signals) to act as one unit to process associated gas stream 12 (also referred to herein as "flare gas" or "raw feed gas" or associated gas or natural gas stream). System 10, with an associated gas stream input from a source 11, is capable of being scaled or sized to an end-user's needs that may include, but is not limited to, a combination of a compressor skid 14 (as required), a sulfur removal subsystem 16 (sized per wellsite), storage tank 20, a common skid 24, separation skid 48, conditioning skid, thermal management skid compressions skid, wet gas skid, dry gas skid, liquid natural gas (LNG) system skid, and, a product transport skid. Common skid 24 can house computerized control subsystems comprising one or more controllers 40 and the fluid and electrical interconnections with and between the other modules forming a closed loop control network to monitor, meter, and control gas flows (including feed gas), water flow, and electrical power distribution, as well as all other system parameters. Separation skid 48 can include a JT apparatus, a water removal subsystem 50, and recuperative heating systems 54, 60. Each module will be discussed in detail below.

System 10 can convert methane and non-methane hydrocarbon gases of any composition (e.g. ethane, propane and butane), including inter alia ranges from 100% ethane or nonmethane components to 100% methane, into usable products including methane rich product gas (dry gas) streams suitably for use in gas pipelines and lower methane content products including blended gas used to power e.g. combined heating and power applications onsite for a client. A carbon dioxide removal system can be added to system 10 if carbon dioxide levels in product gas 38 are too high to produce pipeline quality methane rich gas stream (if so desired) even after enrichment of converted or blended gas (processed gas 36) with system feed gas or dry gas 18A (discussed in detail below).

System 10 can be remotely monitored and controlled to monitor all conditions within the system including quality of all gas streams (including transient/upset/spike responses), temperatures, pressures, flows, etc., such that safeguards are in place with warning systems and emergency shutdowns. System 10 can also be capable of remote starts and automatic remote rerouting of gas streams in response to changed demand or operating conditions (e.g. detected changes in pressure of, inter alia, input gas, conditioned gas, dry gas, NGLs and wet gas, converted gas, or blended gas).

In some embodiments, an associated gas stream 12, including alkane gases, may include a varying composition that enters system 10. Associated gas stream 12 may contain alkanes methane, propane, ethane, butane, pentane, hexane in high mole fractions as well as carbon dioxide, nitrogen, water vapor, and hydrogen sulfide.

In some embodiments where the well pressure is less than the conversion system requirements, a compressor skid 14 of the compressor subsystem 126 compresses the associated gas stream 12 to a defined gage pressure and transmits the associated gas stream 12 or conditioned gas stream to system 10 and components therein in an on-demand configuration. Compressor 14 can be a single or multi stage well head gas compressor that compresses associated gas stream 12 into a pressure vessel (not shown), which holds the associated gas or conditioned gas at a higher pressure than required by system 10. The compressor 14 has a set-able outlet pressure and is on-demand.

A sulfur removal subsystem 16 can remove organic sulfurs and hydrogen sulfide from an associated gas stream 12 to create a sulfur free feed gas or conditioned gas 18 (also referred to as "system feed gas"). In some embodiments, sulfur removal subsystem 16 can remove the organic sulfurs and hydrogen sulfide through hydrogenation and absorption. As understood by one of ordinary skill in the art, any commercially available sulfur removal subsystem 16 is acceptable.

In accordance with various embodiments, the conversion system 10 includes one of more gas flow meters disposed in the system 10, wherein gas flow at an inlet is a feedback mechanism to adjust feed gas flow rate to create the required product gas production rate.

FIG. 1 illustrates alternative embodiments of the present invention including a gas conversion system 10 adapted with a fully integrated Joule-Thomson (J-T) apparatus 102 (J-T adapted system). The Joule-Thomson apparatus 102 can be a commercially available or custom designed system that facilitates the Joule-Thomson effect and is fully integrated with system 10 and related systems such as software and controls as well as various system 10 processes which may include synthesis and thermal management loops. As such, the J-T adapted system functions as a single gas conversion system which receives feed gas 12 and converts it to a methane rich product gas 111 or dry gas 108 which can be enriched with a portion of feed gas 12 or converted gas 120 to adjust certain gas properties including, but not limited to, methane number and BTU value, in the form of product gas 114. The J-T adapted system in the present configuration increases system production capacity over what is known in the art and improves product gas quality by splitting feed gas 12 into a first methane rich gas stream (dry gas) and a primarily NGL gas stream wherein the NGL gas stream is processed by system 10 into a second methane rich gas stream and combined with the first methane rich gas stream to produce product gas or blended gas 128 which may be enriched with a portion of feed gas 12, input gas, conditioned gas, or dry gas. The integrated J-T apparatus 102 is in fluid communication with associated gas stream input 11 of the gas conversion system 10. Generally, J-T apparatus 102 is capable of receiving the feed gas 12 or conditioned gas to separate that gas 12 into (a) a condensed liquid (J-T liquid) 110 containing primarily non-methane hydrocarbons (C2, C3, C4+) also referred to as NGLs, wherein the condensed liquid 110 in gaseous form (converted gas) is supplied to system 10 as feed gas (associated gas stream input 11), and (b) a dry gas (J-T gas) 108 containing primarily methane and lessor amounts of non-methane hydrocarbons (C2, C3), wherein the dry gas 108 is blended with the product gas 38 or the product gas 120 to form product gas 114.

The associated gas stream 12 can be split into multiple streams at the conditioning subsystem 22, blending subsystems (26, 28), or separating subsystems 32. For example, a bypass stream of sulfur free natural gas stream 18A (conditioned gas) can be directed to subsequent application units (e.g. pre-separation application units 146A), and a sulfur free natural gas stream for J-T apparatus 102 feed gas 18B. The Joule-Thomson apparatus 102 facilitates the Joule-Thomson effect, whereby the sulfur free natural gas stream for system feed gas 18B (conditioned gas) is separated into two streams: a dry gas stream 108 that contains primarily methane and lessor amounts of non-methane hydrocarbons (C2, C3), and a condensed liquid stream 110 that contains primarily non-methane hydrocarbons (C2, C3, C4+) also referred to as NGLs. The condensed liquid 110 stream may be vaporized prior to entering the second blending subsystem 28 and/or the NGL and wet gas subsystem 52, which produces the blended gas 128, product gas 38, or other unit products. One embodiment of the product gas 38, converted gas 120 or blended gas 128 can include methane content in the range of 80-90%, carbon dioxide content in the range of 10-15%, and hydrogen content about 1%. Product gas 38, converted gas 120 or blended gas 128 may be passed through a carbon dioxide removal apparatus 104 to substantially remove carbon dioxide 106 to form a higher methane content product gas 120 converted gas 120 or blended gas 128. Dry gas stream 108 can be blended with product gas 38, product gas 120 or blended in an amount equal to a predetermined blend percent of product gas 38 or product gas 120, up to 100% of dry gas stream 108 produced, to expand system 10 production capacity and improve product gas or blended gas 128 quality including, but not limited to, adjusting for the desired methane number and/or gas BTU value in the form of a first blended or product gas 111. Then the bypass stream of sulfur free natural gas stream 18A can be blended with the first blended or product gas 111 in an amount equal to a predetermined enrichment percent of the first blended or product gas 111 to expand production capacity of the J-T adapted system and improve product gas quality including, but not limited to, adjusting for the desired methane number and/or gas BTU value in the form of a second blended or product gas 114.

The J-T adapted conversion system can operate as an on-demand system to produce second blended or product gas 114 only as required or demanded by the applications. In an example using genset, as genset ramps up, J-T apparatus or separation subsystem 32 will increase J-T apparatus feed gas or conditioned gas 18B flow and natural gas stream 18A flow to meet the ramping genset feed gas need/demand; and vice versa with J-T adapted system ramping down in concert with genset demand to point of shutoff. J-T apparatus or separation subsystem 32 is capable of either matching the genset demand by controlling feed gas or conditioned gas 18B flow and having natural gas stream 18A follow with 18A flow equal to a pre-determined percent of product gas 114 flow (enrichment target), or by controlling natural gas stream 18A flow and having feed gas or conditioned gas 18B follow with 18B flow adjustment occurring only when 18A flow represents an enrichment percent exceeding pre-set upper or lower enrichment percent limits. When feed gas or conditioned gas 18B flow adjustment is necessary, 18B flow will increase or decrease according to an algorithm determined amount to return natural gas stream 18A to the enrichment target. Below outlines an example of on-demand based control of J-T apparatus or separation subsystem 32 by control subsystem 30 for monitoring and controlling production of product gas 114 in real time.

An embodiment of the present invention combines the J-T adapted conversion system with automated direct feedback control to match the feed gas (e.g. conditioned gas 18, dry gas 108, or wet gas 56) consumption rate of the supported application or one or more application units (including pre-separation application units 146A, dry gas application units 146B and/or NGL and wet gas application units 146C), such as a generator, micro-turbines, gas compression engine, or other gas power unit or gas consuming unit with the product gas 114 production rate of the J-T adapted system. J-T adapted conversion system can use pressure transducer (s), pressure sensor(s) or gas flow meters as the feedback mechanism and/or component (or monitoring component or sensing component or measuring component). Pressure or gas flow at the application inlet 46A is used to determine whether the generator is shutdown, shutting down, starting up, or transiting between low and high power settings and visa-versa. This measured pressure or gas flow is fed into a closed loop control system to adjust the J-T adapted conversion system parameters to create the required product gas 114 production rate.

FIG. 2 illustrates yet another example embodiment and application of the J-T adapted conversion system in a diagram depicting system components. Associated gas 12 as input gas passes through sulfur removal subsystem 16 to form sulfur free natural gas stream 18 (conditioned gas), of which a portion 18C can be used as fuel for the gas application units of the gas conversion system 10 (e.g. pre-separation gas application units 146A) and the remaining portion 18D is feed gas (conditioned gas) for the J-T apparatus 102. The conditioned gas subsystem or J-T apparatus feed gas 18D or conditioned gas can pass through a dehydrator 124 to reduce the liquid ($H_2O$) content and a compressor 126 to increase the pressure of the J-T apparatus feed gas 18D or conditioned gas to suitable conditions for the J-T apparatus 102 to facilitate the J-T effect on the J-T apparatus feed gas 18D or conditioned gas to form J-T products. The J-T processed feed gas 132 or conditioned gas is prepared for separation in the natural J-T separator 102 for separation into two streams: a dry gas stream 108 that contains primarily methane and lessor amounts of non-methane hydrocarbons (C2, C3), and a condensed liquid stream 110 that contains primarily non-methane hydrocarbons (C2, C3, C4+). The dry gas stream 108 can flow through main flow control 130 or other controls, controllers or monitoring or sensing components for regulation of flow to downstream compressor 126. Condensed liquid stream 110, which is vaporized prior to entry into second blending subsystem 28 and/or NGL and wet gas subsystem 52 is formed in gas conversion system 10 to converted gas 120. Converted gas 120 flows through dehydrator 124 to reduce the liquid content to a substantially dry methane rich product gas 134 suitable for compression. Dry gas stream 108 and substantially dry methane rich product gas 134 or converted gas 120 flow through compressor 126 to adjust for the desired methane number and BTU value and to increase the pressure of the substantially dry blended methane rich product gas 136 suitable for filling a transportation container, such as a tanker truck 138. The tanker truck 138 can then be driven to a remote location and connected to a valve of the valve subsystem 140 to regulate flow into the expander to fuel e.g. a remote genset.

In accordance with an example embodiment and application of the gas conversion system 10 employing the J-T apparatus, however, the J-T apparatus 102 is provided at a remote location. Associated gas 12 as input gas passes through sulfur removal subsystem 16 to form conditioned gas or sulfur free natural gas stream 18, of which a portion 18C can be used as fuel for the application units of the gas conversion system 10 and the remaining portion 18D as conditioned gas or feed gas for the J-T apparatus 102 at the remote location. The J-T apparatus feed gas 18D or conditioned gas can pass through a dehydrator 124 to reduce the liquid content and a compressor 126 to increase the pressure of the J-T apparatus feed gas 18D or conditioned gas to suitable conditions for filling a transportation container, such as a tanker truck 138. The tanker truck 138 can then be driven to a remote location and connected to valve 140 to regulate flow into the J-T apparatus 102. The J-T apparatus feed gas 18D or conditioned gas in the tanker truck 138 is at a pressure sufficient to facilitate the J-T effect on the J-T apparatus feed gas 18D or conditioned gas to form J-T processed feed gas 132. The J-T processed feed gas 132 is prepared for separation in the J-T apparatus for separation into two streams: a dry gas stream 108 that contains primarily methane and lessor amounts of non-methane hydrocarbons (C2, C3, wherein primarily is defined to be at least 51% or greater and is practice is much higher, and lessor is defined to be totaling less than 49% and in practice is much lower), and a Condensed liquid stream 110 that contains primarily non-methane hydrocarbons (C2, C3, C4+). The dry gas stream 108 has sufficient methane and BTU value to be used as a fuel for the remote application units (e.g. genset 144). The Condensed liquid stream 110 is pumped into another tanker truck to deliver the condensed liquid stream 110 to e.g. a tank at another location for use as feed gas to a gas conversion system 10 or appropriate application unit. The condensed liquid stream 110 may be regulated through a valve 140 to a pump 148 where it is fed to a vaporizer 150 and subsequently to system 10 where it is converted into a methane rich product gas 38 or converted gas. Sulfur free natural gas stream 18A can be blended with product gas 38 or converted gas 120 to adjust for targeted properties such as methane number and BTU value to produce an enhanced product gas or blended gas 128 for various local and remote uses including power generation and compression.

Such transport, power generation, facility combined heat and power (CHP), natural gas manufacture or other production are additionally managed by the application unit product subsystem 58, which directs unit products produced by one or more of: the one or more pre-separation applications units 146A, the one or more dry gas applications units 146B, the one or more NGL and wet gas applications units 146C, and each of these one or more pre-separation applications units 146A, the one or more dry gas applications units 146B, the one or more NGL and wet gas applications units 146C may be interconnected or dynamically grouped such that each may be used in place of the other or combined based on the selectable configuration of the conversion system.

System feed gas 12, conditioned gas 18, dry gas 108, converted gas 120, or NGL/wet gas 56 can pass through a common skid 24. A portion 18A of the system feed gas 18 conditioned gas, dry gas 108, converted gas 120, or NGL/wet gas 56 can be routed to an enrichment mixing valve 34 to blend with other gases including conditioned gas, dry gas, converted gas, or NGL/wet gas 56 from other components in an amount equal to a predetermined or variable percent of processed gas 36 (enrichment percent, % E) to form product gas 38 or blended gas 128. The % E is set to yield and/or control certain targeted values for product gas 38 or blended gas 128 including, but not limited to, minimum methane number and maximum energy density. The enrichment percent can either be a predetermined constant or a variable set point changing with the properties of certain system gases including, but not limited to, feed gas 18 conditioned gas 120, dry gas 18, converted gas 120, or NGL/wet gas 56 and processed gas 36 or blended gas 128. In addition, enrichment of system 10 processed gas 36 increases system 10 total product gas 38 or blended gas 128 capacity. In cases where % E is zero, processed gas 36 has the same gas composition as product gas 38, and the terms are interchangeable herein with regards to technical and legal interpretation. The remaining portion 18B of the system feed gas 18 exits common skid 24 for subsequent processing and/or production. The predetermined enrichment percent (% E) can be determined based on measured heating value and/or methane number and/or composition of the system feed gas 18 (or associated gas stream 12), conditioned gas, dry gas, converted gas, or NGL/wet gas 56 and processed gas 36, blended gas 128 and/or product gas 38. The % E, in combination with other process controls, can be used to control gas ratios and component temperatures to adjust the methane percentage in the product gas 38. In other words, the predetermined percentage is based on one or more of measurement of heating value, heat range methane number and composition of feed gas, conditioned gas, dry gas, converted gas, or NGL/wet gas 56 and processed gas 36 or blended gas 128 and/or product gas. One embodiment of the enrichment (or blending) strategy includes a flame ionization detector (FID) and/or gas chromatography instrument (e.g. analytes analysis) and/or an infrared composition sensor to control and/or maintain the % E at its predetermined value by measuring the heating value of various system 10 gas streams. The enrichment percent determination can be automated to vary the enrichment percentage based on real-time fluctuations in constituent compositions of certain system 10 gas streams such as system feed gas 18 (or associated gas stream 12). An infrared composition sensor (not shown) in concert with the FID can result in higher reliability in detecting changes in non-methane hydrocarbons (NMHC) which yield variations in gas heating value. Oxygen sensors in application units can further aid with energy content calculations to facilitate higher confidence in the analyses needed for secure control of % E and other system 10 parameters. For example, a flame ionization detector (FID) can use dry gas 40 as a reference flame (see, FIG. 1 and FIG. 2) to measure the ionization extent of system feed gas 18. The dry gas composition is relatively stable independent of system feed gas 18 (or associated gas stream 12) composition. FID determined ionization values in combination with IR sensor determined composition measurements could be compared for system gases including, but not limited to, feed gas 18, associated gas stream 12, conditioned gas 18, dry gas 108, converted gas 120, or NGL/wet gas 56 and processed gas 36 or blended gas 128, and product gas 38 to control system parameters such as gas ratios, operating temperatures, and the constant or variable enrichment percent. These measurements, analysis, and adjustments are performed by controllers 40 of the control subsystem 30, which is in electrical connectivity with all of the modules to receive, store, and analyze measured parameters and to transmit control commands to the modules to adjust flow meters, valves, application unit and other component temperature settings, etc. to optimize the product gas 38. Enrichment reduces the load on conversion system 10 or, alternatively, increases system 10 capacity as well as dilutes CO2 and inert gases in processed gas 36.

A portion 18C of system feed gas 18B (input gas) or conditioned gas can be routed to the first blending subsystem 26 to be directed to fuel the one or more pre-separation application units 146A to be used without further processing (as in the case where input gas from wells is momentarily of high enough quality to fuel e.g. multi-fuel micro-turbines with minimal adjustment or conversion). Another portion 18D of system feed gas 18B (input gas) or conditioned gas can be routed to fuel the dry gas application units 146B of the dry gas subsystem 108. The remaining portion 18E of the system feed gas 18B (input gas) or conditioned gas can be routed through the separating subsystem 32 or second blending subsystem 28, thereby operating to augment or mix with NGL or converted gas 120 (wet gas 56) streams to produce blended gas 128 with the proper demanded enrichment percentage, to be subsequently used by the one or more wet gas application units 146C of the NGL and wet gas subsystem 52. These many different alternative paths are controlled by the control subsystem 30, which monitors and manages both the relative quantities of each of the products produced and the composition of each product, automatically and continually making adjustments in process to address changing demand, changing operating conditions or changing environmental conditions (including associated gas source conditions and gas composition). The application unit product subsystem 58 further manages use and transport of these many diverse gas products. For example, dry gas products may be transported for pipeline use, while wet gas 56 is used to generate electricity to run facilities and pre-separation gas is used for thermal management and energy to drive the method itself, while both wet gas application units 146C and pre-separation gas application units 146A generate additional byproducts in the form of excess exhaust heat that is then used for additional CHP applications at the facilities themselves. The flexibility of the system allows for many different formulations and combinations, where a person having ordinary skill in the art will recognize, that the method and system can duplicate the various subsystems and run them in series or parallel so as to produce additional intermediate products and by products by the automatic control of each of the many sets of subsystems using the closed loops of the control subsystem. This flexibility extends to even including application units 146 (e.g. multi-fuel micro-turbines) in subsets and subsystems of application units 146 (e.g. pre-separation gas application units 146A, dry gas application units 146B, wet gas application units 146C, etc.) that can be configured to be interchangeable (such that a pre-separation gas application unit may be interconnected with other units including wet gas application units 146C so that when demand changes the feed gas provided can be routed from a different source or component within the system effectively repurposing the pre-separation gas application unit as a wet gas application unit 146C for a temporary period to most effectively run the system).

Components of subsystems, such as compressors 14, dehydrators 124, or valves 140 may also be inserted or duplicated at any number of points based on requirements for individual implementations including maintaining flow, pressure, temperature, humidity or moisture content, and other properties or characteristics well understood by those of skill in the art.

Similarly, removed constituents from the gas conditioning subsystem 22 may be diverted by valves or components of a removal subsystem 44 to high-pressure gas storage tanks 20, offsite transportation conduits, flaring components, or preferably, rerouted to the second blending subsystem 28 and/or NGL and wet gas application subsystem 52 for measured, selective re-blending or augmentation of other gas streams to meet demand for products with particular specifications that allow re-introduction of such removed constituents in controlled quantities. Thus, the gases can be transported through the system and added back to various gas or fluid flows where product thresholds and specifications will allow. The control subsystem 30 monitors and controls this reallocation of removed constituents in much the same manner as it monitors and controls pre-separation first blending subsystem 26 activity, and in certain embodiments, removed constituents may be controlled and reallocated as a part of the first blending subsystem 26 (or second blending subsystem 28 depending on system configuration).

Conversion system 10 can create pipeline quality natural gas (dry gas 108) from associated gas stream 12 to generate power 46 for operation of on-site equipment and off-site utilities during system 10 operation. On site power may be fueled by a portion 68 of conditioned gas, product gas 38 or blended gas 128 as well. Power 46 can be supplied to each module requiring electricity, such as the controller 42, application units 146, thermal management subsystems 34, blending subsystems (26, 28), conditioning subsystems 22 etc. Accumulator 70 can be in-line with power production as part of the application unit product subsystem to store product gas portion 68 for startup fuel, for reserve fuel when there is a fluctuation in (transient flow) or interruption of associated gas stream 12, and for reserve fuel for other causes of inoperability of system 10 for producing product gas 38 or blended gas 128. FIG. 2 is an illustration of how the product gas 38 or blended gas 128 produced from the gas conversion system 10 discussed in detail in with respect to FIG. 1 is prepared for transportation to another site.

At many points throughout the process of transforming gases in the conversion system, gases can be compressed by compressors or flow through a dehydrator 124 to remove liquids from product gas 38 to form e.g. a substantially dry blended high methane rich product gas 136 suitable for compression. The substantially dry blended high methane rich product gas 136 can be metered through valve 140 for controlled pumping by pump 148 into a transportation container, such a tanker truck 138, for delivery to another location where substantially dry blended high methane rich product gas 136 can be used as fuel for power generation units, such as gensets. Generally, additional compressors or dehydrators may be disposed along fuel conduits between subsystems, such as being disposed after the separator subsystem 32 or prior to the sets of one or more wet gas application units 146C.

Recuperative heating subsystems 54 and 60 may also be deployed as part of the conversion system in accordance with one embodiment of the present invention will now be described. System power requirements have been reduced to operate, for example, the application units 146 with the use of recuperative heating systems 54, 60. Recuperative energy transfer subsystem 54 is comprised of one or more heat exchangers, reducing or increasing the temperature of feed gas 66, converted gas 120 or other gas. The modified temperature of wet gas 56 from recuperating energy transfer subsystem 54 is prepared for water removal by water removal subsystem dehydrators 50. Similarly, recuperative energy transfer subsystem 60 is designed to increase the temperature of dry gas 108 at heat exchanger 60A. It should be understood that heat exchanger 54A and heat exchanger 54B can include one or more heat exchangers of any suitable construction and type. In summary, recuperating energy transfer subsystems 54 and 60 reduce the load on the thermal management subsystems, thereby reducing application gas consumption, system emissions, and/or lower temperature gradients specific subsystems and components.

Conversion system 10 can operate as an on-demand system to produce processed gas 36, dry gas 108 or blended gas 128 only as required or demanded by the applications—e.g., in case of genset, as genset ramps up, system 10 can increase feed gas 18B, input gas or conditioned gas flow to meet the ramping genset feed gas need/demand; and vice versa with system 10 ramping down in concert with genset demand to point of shutoff. System 10 is capable of either matching the genset demand by controlling feed gas 18B flow (metered in proportion to flow demand requirements) or matching genset demand by controlling conditioned gas flow (by adjusting production rates and quantities). Below are examples of On-Demand based control of system 10 for monitoring and controlling production of product gas 38, blended gas 128, dry gas 108, and or NGLS and wet gas 56 in real time.

One embodiment of the present invention combines gas converting technology with automated direct feedback control to match the feed gas consumption rate of the supported application, such as a generator, gas compression engine, or any other gas consuming unit with the product gas 38 production rate of system 10. System 10 can use pressure transducer(s) or sensor(s) as the feedback mechanism (in the form of one or more measuring components, feedback components, monitoring components or sensing components). Pressure at the application inlet 46A is used to determine whether the subsystem or generator in question is shutdown, shutting down, starting up, or transiting between low and high power settings and visa-versa. This measured pressure value is fed into a closed loop control system to adjust the system 10 parameters to create the desired product gas 38 blended gas 128, dry gas 108, or NGL and wet gas 56 production rate.

Another embodiment of the present invention combines gas converting technology with automated direct feedback control to match the feed gas consumption rate of the supported application, such as a generator, gas compression engine, or other gas consuming unit with the product gas 38 production rate of system 10. System 10 can use gas flow meters(s) as the feedback mechanism (in the form of one or more measuring components, feedback components, monitoring components or sensing components). Gas flow at the application inlet 46A is used to determine the required/desired production rate in real time. This production rate value is fed into a closed loop control system to adjust the feed gas 18B flow rate to create the required product gas 38 blended gas 128, dry gas 108, or NGL and wet gas 56 production rate.

Yet another embodiment of the present invention combines gas converting technology along with automated direct feedback control to match the feed gas consumption rate of the supported application, such as a generator, a gas compression engine, or other gas consuming unit with the product gas 38 production rate of system 10. System 10 can use pressure transducer(s) or sensor(s) as the feedback mechanism (in the form of one or more measuring components, feedback components, monitoring components or sensing components). Pressure at the application inlet 46A is used to determine the required production rate in real time. This requirement is fed into a closed loop control system to adjust the flow rate (in the case of feed gas 18B flow following flow) to create the required product gas 38, blended gas 128, dry gas 108, or NGL and wet gas 56 production rate.

Yet another embodiment of the present invention combines gas converting technology along with automated direct feedback control to match the feed gas consumption rate of the supported application, such as a generator, gas compression engine, or other gas consuming unit with the product gas 38, blended gas 128, dry gas 108, or NGL and wet gas 56 production rate of system 10. The system uses gas flow meters(s) as the feedback mechanism (in the form of one or more measuring components, feedback components, monitoring components or sensing components). Gas flow at the application inlet 46A is used to determine the required production rate in real time. This requirement is fed into a closed loop control system to adjust the flow rate (in the case of feed gas 18B or input gas) to create the required product gas 38 blended gas 128, dry gas 108, or NGL and wet gas 56 production rate.

Examples illustrating various ways to adjust system parameters include: increasing flow from the first blending subsystem 26 to the separating subsystem 32; decreasing flow from the first blending subsystem 26 to the separating subsystem 32 and increasing flow to the one or more pre-separation application units 146A; increasing flow from the second blending subsystem 28 to natural gas liquid (NGL) and wet gas subsystem 52; decreasing flow from the second blending subsystem 28 to natural gas liquid (NGL) and wet gas subsystem 52; increasing flow to one or more of: the one or more pre-separation application units 146A, the one or more dry gas application units 146B, or the one or more wet gas application units 146C, in response to a decrease in pressure from a pressure sensor below a minimum pressure threshold when those application units are ramping up to meet increased power demand; decreasing flow to the one or more of: the one or more pre-separation application units 146A, the one or more dry gas application units 146B, or the one or more wet gas application units 146C, in response to an increase in pressure from a pressure sensor above a maximum pressure threshold when those application units are ramping down to meet decreased power demand; decreasing flow to the one or more of: the one or more pre-separation application units 146A, the one or more dry gas application units 146B, or the one or more wet gas application units 146C, in response to maintain pressure; increasing flow to units of the application product system in response to an increase in power demand; increasing/decreasing flow of the blended gas 128 in response to the one or more application units ramping down for a decrease in power demand; and increasing/decreasing flow of the blended gas 128 in response to the one or more application units ramping down for a decrease in power demand.

In accordance with various embodiments, the system 10 includes one of more gas flow meters disposed in the system 10, wherein gas flow at an inlet is a feedback mechanism (in the form of one or more measuring components, feedback components, monitoring components or sensing components) to adjust feed gas flow rate to create the required product gas production rate.

Generally, what has been described is a gas conversion system to form a product gas 38 or blended gas 128 or dry gas 108 or NGLs and wet gas 56 from an associated gas stream, wherein the associated gas stream contains methane and non-methane hydrocarbons. In one embodiment, the gas conversion system includes a controller of a control subsystem 30, a conditioning subsystem 22, a separating subsystem 32, multiple blending subsystems (at least 26, 28) further comprising at least a mixing valve subsystem 140 capable of flow controlling at least a portion of the associated gas stream and process gas streams, and multiple application unit subsystems and multiple application unit product subsystems 58.

In accordance with one example embodiment, the system further includes a carbon dioxide removal apparatus capable of substantially removing carbon dioxide from the synthetic wet processed gas 56, a processed gas 36, or a blended gas 128. Due to the many alternative paths that may be taken by gas streams for processing, feed gas generally is any type of gas supplied to a component, product gas is any gas that is the product of a component or subsystem operating to transform the gas into an end product, and process gas is any of the interim stages or compositions of gas therebetween. Terms including conditioned gas, dry gas 108, converted gas 120, or NGL/wet gas 56 and/or blended gas 128, while in certain instances overlapping in definition or description with the more general terms of feed gas, product gas and process gas, particularly refer to gas streams associated with specific subsystems or specific method steps.

In one embodiment, the system includes a thermal management system capable of extracting heat from at least one of the subsystems or gas streams including the wet gas 56 and the synthetic natural gas wet processed gas 56 to increase temperatures of at least one of (i) the feed gas, and (ii) components of subsystems.

In accordance with one example embodiment, the gas conversion system includes: at least one gas application unit capable of receiving the product gas or blended gas 128; and a controller in communication with at least one of a feedback component, monitoring component, or sensing component positioned at a product gas inlet of the at least one gas application unit 146 (e.g. pre-separation gas application unit 146A, dry gas application unit 146B, wet gas application unit 146C, etc.) to form a closed loop control system, wherein the feedback component, monitoring component, or sensing component comprises at least one of a pressure sensor and a gas flow meter; wherein the controller is capable of adjusting system parameters to vary product gas production rate to match the fuel flow demand of the at least one gas application unit in real-time, on-demand based on measurements from the feedback component. The one or more controllers are capable of: monitoring fuel flow demand of the at least one gas application unit, and transmitting one or more command signals to one or more control devices of the gas conversion system 10 control subsystem 30 in response to changes in the fuel flow demand as determined by the feedback component, monitoring component, or sensing component, whereby the production of product gas, blended gas 128, dry gas 108 or wet gas 56 is controlled to match the fuel flow demand of the at least one gas application unit. In one embodiment, the one or more command signals adjust output flow in response to changes in pressure or changes in gas flow from the feedback component, monitoring component, or sensing component resulting from a change in fuel flow demand from the at least one gas application unit, wherein the output flow is adjusted to match product gas, blended gas 128, dry gas 108 or NGL and wet gas 56 production with fuel flow demand by maintaining at least one of the pressure and the gas flow within predetermined threshold limits.

In accordance with one example embodiment, the one or more command signals includes a command signal configured to adjust flow of feed gas or input gas in response to changes in the output flow of the products of the system, wherein the feed gas or input gas flow rate is adjusted to maintain a predetermined ratio within threshold limits. Another one or more command signals may be provided to adjust pressure of the system gas in response to changes in the output flow of the one or more gas application units.

In accordance with one example embodiment, the one or more command signals includes a command signal configured to adjust flow of feed gas in response to changes in pressure or changes in gas flow from the feedback component, monitoring component, or sensing component resulting from a change in fuel flow demand from the one or more gas application units, wherein the output flow of the feed gas is adjusted to match product gas or blended gas 128 or dry gas 108 or NGL and wet gas 56 production with fuel flow demand by maintaining at least one of the pressure and the gas flow within threshold limits.

In accordance with one example embodiment, the controller further comprises an automated direct feedback control to vary a product gas, blended gas 128, dry gas 108, or NGL and wet gas 56 production rate to match a fuel consumption rate of the one or more gas application units, wherein a measurement from the feedback component, monitoring component, or sensing component is a feedback mechanism to adjust flow rate to increase at least one of the pressure and flow rate at the product gas inlet of the one or more gas application units back to a predetermined level, thereby creating the required gas production rate.

In accordance with one example embodiment, the one or more controllers further comprise an automated direct feedback control to vary product gas, blended gas 128, dry gas 108 or NGL and wet gas 56 production rate to match a fuel consumption rate of the at least one gas application unit, wherein a pressure measurement from a pressure sensor is a feedback mechanism (feedback component, monitoring component, or sensing component) to adjust flow rate to create the required gas production rate.

In accordance with one example embodiment, the system further includes at least one enrichment mixing valve subsystem 140 configured to mix a predetermined percentage of at least another portion of the associated gas stream (e.g. dry gas 108) with the processed gas 36 (e.g. converted gas 120) in a ratio that creates a product gas stream (e.g. blended gas 128) with predetermined target values for at least one of methane number, heating value and composition. The predetermined percentage is adjusted based on measurement of at least one of heating value, methane number, and composition for one or more of the associated gas or input stream, conditioned gas, dry gas 108, converted gas, NGL and wet gas 56, processed gas 36, blended gas 128 and product gas in order to maintain product gas within threshold limits for the predetermined target values. The system may further include a flame ionization detector (FID) and an Infrared composition sensor to measure heating value of at least one of the associated gas or input stream, feed gas, conditioned gas, dry gas 108, converted gas, NGL and wet gas 56, processed gas 36, blended gas 128 and product gas 38.

The system may further include a conduit or pipe components or subsystems in fluid communication or fluid connectivity with one or more other subsystems or components for use during non-operation, startup, shutdown, and heat ups to supply various types of gas or products thereof.

In accordance with one example embodiment, the system further includes a Joule-Thomson (J-T) apparatus capable of receiving at least a portion of the associated gas stream and separating the at least a portion of the associated gas into (a) a condensed liquid containing primarily non-methane hydrocarbons, wherein the Condensed liquid in gaseous form substitutes for the at least a portion of the associated gas stream being received by the mixing valve system, and (b) a dry gas 108 containing primarily methane and lessor amounts of non-methane hydrocarbons, wherein the dry gas 108 is blended with the product gas 38 to form a second product gas 114.

The gas conversion system may further include a vaporizing apparatus configured to receive the condensed liquid and convert the condensed liquids to gaseous form as converted gas 120 and supply the condensed liquids or converted gas 120 to the mixing valve system. In one embodiment the system includes a carbon dioxide removal apparatus capable of substantially removing carbon dioxide from the product gas to form a second product gas 114, wherein the dry gas 108 is blended with the second product gas 114 to form a third product gas.

In accordance with one example embodiment, the remaining portion of the associated gas stream is further blended with the third product gas to form the fourth product gas.

In accordance with one example embodiment, the system includes: one or more gas application units (comprising gas power units) capable of receiving the product gas as unit feed gas; and a controller in communication with a feedback component, monitoring component or sensing component positioned at a fuel gas inlet for the one or more gas application units to form a multiple closed loop control system, wherein the feedback component, monitoring component or sensing component includes at least one of a pressure sensor and a gas flow meter; wherein the controller is capable of adjusting system parameters to vary product gas, blended gas 128, dry gas 108 or NGL and wet gas 56 flow to match the fuel flow demand of the one or more gas application units in real-time, on-demand, based on measurements from the measuring component, feedback component, monitoring component or sensing component. The system may include one or more gas application units capable of receiving the product gas as unit feed gas or conditioned gas; and a controller in communication with a feedback component, monitoring component or sensing component positioned at a fuel gas inlet for one or more gas application units to form a closed loop control system, wherein the feedback component, monitoring component or sensing component includes at least one of a pressure sensor and a gas flow meter; wherein the controller is capable of: monitoring fuel flow demand of the one or more gas application units, and transmitting one or more command signals to one or more control devices of the gas conversion system in response to changes in the fuel flow demand as determined by the feedback component, monitoring component or sensing component; whereby the production of product gas, blended gas 128, dry gas 108 or NGL and wet gas 56 is controlled to match the fuel flow demand of the one or more gas application units. Regardless of whether or not the system includes a carbon dioxide removal apparatus, various embodiments also include the following embodiments.

In the one or more command signals adjust the feed gas flow rate in response to changes sensed by the feedback component, monitoring component or sensing component resulting from a change in fuel flow demand from the one or more gas application units, wherein the flow rate of feed gas is adjusted to match product gas, blended gas 128, dry gas 108, or NGL and wet gas 56 production with fuel flow demand by maintaining at least one of pressure and gas flow within predetermined threshold limits.

In accordance with one example embodiment, the system further includes an enrichment system which mixes natural gas stream of conditioned gas, dry gas 108 or converted gas 120 (or removed constituents) with product gas including blended gas 128 or wet gas 56 in an amount equal to a predetermined enrichment percent of the product gas such that the product meets predetermined target values for at least one of methane number, heating value and composition. The predetermined enrichment percent is adjusted based on measurement of the heating value, heating range, pressure, methane number and/or composition of these product gases and/or natural gas stream in order to maintain the product gases within threshold limits of the predetermined target values.

In accordance with one example embodiment, the one or more command signals includes a command signal configured to adjust natural gas stream flow rate in response to changes in a measurement from the feedback component, monitoring component or sensing component resulting from changes in fuel flow demand from the one or more gas application units, whereby the flow rate of natural gas stream is adjusted to match product gas, blended gas 128, dry gas 108, or NGL and wet gas 56 production with fuel flow demand by maintaining at least one of the pressure and the gas flow within threshold limits.

In accordance with one example embodiment, the gas conversion system includes an enrichment system whereby product gas 38, blended gas 128, dry gas 108 or NGL and wet gas 56 is mixed with other gas streams in an amount equal to a predetermined enrichment percent such that the product gas meets predetermined target values for at least one of methane number, heating value and composition. In accordance with one example embodiment, the enrichment system adjusts the flow rate of feed gas to control the production rate of the product gas in order to maintain the amount of product gas mixed with other gas stream within threshold limits of the predetermined enrichment percent. The predetermined enrichment percent is adjusted based on measurement of the heating value, heating range, methane number and/or composition of product gas 38, conditioned gas 18, dry gas 108, converted gas 120, blended gas 128, NGL and wet gas 56 and/or natural gas stream in order to maintain each product gas within threshold limits of the predetermined target values.

A computing device can be used by the control subsystem 30 to implement the system and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 700 is depicted in FIG. 3. The computing device 700 is merely an illustrative example of a suitable computing environment and in no way limits the scope of the present invention. A "computing device," as represented by FIG. 3, can include a "workstation," a "server," a "laptop," a "desktop," a "hand-held device," a "mobile device," a "tablet computer," or other computing devices, as would be understood by those of skill in the art. Given that the computing device 700 is depicted for illustrative purposes, embodiments of the present invention may utilize any number of computing devices 700 in any number of different ways to implement a single embodiment of the present invention. Accordingly, embodiments of the present invention are not limited to a single computing device 700, as would be appreciated by one with skill in the art, nor are they limited to a single type of implementation or configuration of the example computing device 700.

The computing device 700 can include a bus 710 that can be coupled to one or more of the following illustrative components, directly or indirectly: a memory 712, one or more processors 714, one or more presentation components 716, input/output ports 718, input/output components 720, and a power supply 724. One of skill in the art will appreciate that the bus 710 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 3 is merely illustrative of an exemplary computing device that can be used to implement one or more embodiments of the present invention, and in no way limits the invention.

The computing device 700 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 700.

The memory 712 can include computer-storage media in the form of volatile and/or nonvolatile memory. The memory 712 may be removable, non-removable, or any combination thereof. Exemplary hardware devices are devices such as hard drives, solid-state memory, optical-disc drives, and the like. The computing device 700 can include one or more processors that read data from components such as the memory 712, the various I/O components 716, etc. Presentation component(s) 716 present data indications to a user or other device. Exemplary presentation components include a display device, speaker, printing component, vibrating component, etc.

The I/O ports 718 can enable the computing device 700 to be logically coupled to other devices, such as I/O components 720. Some of the I/O components 720 can be built into the computing device 700. Examples of such I/O components 720 include a microphone, joystick, recording device, game pad, satellite dish, scanner, printer, wireless device, networking device, and the like.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various parameters (sometimes referred to as requirements) are described which may be appropriate for some embodiments but not for other embodiments.

From the foregoing, it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Also, contemplated herein are methods which may include any procedural step inherent in the structures and systems described. Accordingly, the disclosure and associated technology can encompass other embodiments not expressly shown or described herein.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

To any extent utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method for managing variable, multi-phase fluid conversion to output fuel and energy, the method comprising:

receiving, by a gas conditioning subsystem, a flow of input gas from a gas source input gas stream of varying composition comprising methane and non-methane hydrocarbons;

converting, by the gas conditioning subsystem, the input gas into conditioned gas;

adjusting, with a compressor subsystem, pressure of the conditioned gas;

managing, by a conversion system control subsystem, multiple automatically controlled closed loops to direct fluids and/or gas flow, further comprising adjusting, by a first controller, system parameters to vary conditioned gas flow based on measurements by at least one measurement component in a first closed loop;

receiving and directing, by a first blending subsystem, the conditioned gas into one or more pre-separation application units and/or a separation subsystem;

adjusting, by a second controller in communication with at least one feedback component positioned at or before a gas inlet for the one or more pre-separation gas application units to form a second closed loop of the control subsystem, system parameters to vary conditioned gas flow based on measurements by the at least one feedback component;

receiving, by a separation subsystem comprising a Joule-Thomson (JT) apparatus in fluid communication with the first blending subsystem, a conditioned gas stream;

separating at least a portion of the conditioned gas using a thermal management subsystem and Joule-Thompson effect to condense heavier hydrocarbons out of the conditioned gas stream, to produce (a) a condensed liquid comprising primarily non-methane hydrocarbons, and (b) a dry gas comprising primarily methane and lessor amounts of non-methane hydrocarbons;

directing, by a dry produced gas subsystem in fluid communication with the separation subsystem, dry gas to one or more dry gas application units using a third controller in communication with a monitoring component positioned at or before a fuel gas inlet for the one or more dry gas application units to form a third closed loop of the control subsystem, comprising adjusting, by the third controller, system parameters to vary dry gas flow in real-time, on-demand, based on measurements by the at least one monitoring component;

controlling, by a second blending subsystem in fluid communication with the dry gas subsystem, production of blended gas to match fuel flow demand of one or more wet gas application units by adjusting a flow rate of a dry gas stream through one or more mixing valve subsystems and/or waste gates to control production rate of the blended gas comprising converted gas from the condensed liquid mixed with the dry gas stream within threshold limits of a predetermined enrichment ratio;

directing, by a natural gas liquid (NGL) and wet gas subsystem in fluid communication with the separation subsystem and the second blending subsystem, blended gas to the one or more wet gas application units using a fourth controller in communication with a sensing component, comprising adjusting, by the fourth controller, system parameters to vary blended gas flow in real-time, on-demand, based on measurements by the at least one sensing component;

receiving, by an application unit product subsystem, unit products; and delivering, by the application unit product subsystem, unit products to output destinations according to system parameters, comprising, automatically controlling flow and directing fluids/gases, by the control subsystem, in real time using valves and components to meet one or more of: flow demand, predetermined thresholds, predetermined specifications, and predetermined system parameters.

2. The method of claim 1, wherein the input gas is associated gas and wherein the associated gas stream contains methane and non-methane hydrocarbons.

3. The method of claim 1, wherein gas conditioning subsystem comprises one or more conditioning components performing one or more conditioning operations comprising one or more of: additional gas compression or pressure adjustment, hydrogen sulfide ($H_2S$) removal, nitrogen separation, carbon dioxide ($CO_2$) removal or water removal, liquid natural gas (LNG) or hydrogen adjustment, wherein removed constituents comprising one or more of $H_2S$, nitrogen $CO_2$, hydrogen, LNG or water are diverted for further storage or processing.

4. The method of claim 1, wherein portions of removed constituents and conditioned gas of the first blending subsystem are selectively added or blended back into gas streams supplying one or more of the one or more dry gas application units, the one or more wet gas application units, or the one or more pre-separation gas application units, using valves and components to meet one or more of: flow demand, predetermined thresholds, predetermined specifications, and predetermined system parameters.

5. The method of claim 1, wherein the first blending subsystem receives the conditioned gas from the gas conditioning system in fluid communication with the first blending subsystem and increases or decreases conditioned gas flow to manage heat range and gas constituents/ratios according to predetermined unit specifications, using a diverting valve subsystem to control flow and divert gas unusable or excess of unit specifications to the separation subsystem.

6. The method of claim 1, wherein the second controller of the first blending subsystem adjusts system parameters to vary conditioned gas flow based on measurements by the at least one feedback component according to one or more of: fuel flow demand of the one or more pre-separation gas application units, measured pressure of the conditioned gas, heat range and/or heating value of a gas stream of the one or more pre-separation gas application units, or constituent composition of the conditioned gas, conducted in real-time, on-demand, based on measurements by the at least one feedback component.

7. The method of claim 1, wherein the at least one feedback component of the first blending subsystem comprises at least one of a pressure sensor, a gas flow meter, a flame ionization detector (FID), an infrared composition sensor, gas chromatography instrument, or a non-methane hydrocarbon detector disposed in a fluid circuit, used to measure heating value of at least the conditioned gas.

8. The method of claim 1, wherein the dry produced gas subsystem third controller adjusts system parameters and flow rate according to one or more of: fuel flow demand of the one or more dry gas application units, measured pressure of the dry gas, heat range and/or heating value of a gas stream of the one or more dry gas application units, or gas constituent composition of the dry gas, conducted in real-time, on-demand, based on measurements by the at least one monitoring component.

9. The method of claim 1, wherein the at least one monitoring component of the dry produced gas subsystem comprises at least one of a pressure sensor, a gas flow meter, a flame ionization detector (FID), an infrared composition sensor, gas chromatography instrument, or a non-methane hydrocarbon detector disposed in a fluid circuit, used to measure heating value of at least the dry gas.

10. The method of claim 1, wherein the condensed liquid stream is vaporized using a vaporizing apparatus configured to receive the condensed liquid and convert the condensed liquid to gaseous form converted gas prior to entering the second blending subsystem or receiving dry gas supply at the mixing valve subsystem.

11. The method of claim 1, wherein inside the second blending subsystem the dry gas stream, comprising a portion of the dry gas diverted from being delivered to the one or more dry gas application units, is mixed with one or more of NGLs, condensed liquid in gaseous form or converted gas.

12. The method of claim 1, further comprising the conditioned gas flowing through a dehydrator to remove water or other liquids from the conditioned gas to form a conditioned gas suitable for compression.

13. The method of claim 1, further comprising a carbon dioxide removal apparatus capable of substantially removing carbon dioxide from the conditioned gas to form a conditioned gas, wherein the carbon dioxide removal apparatus is in fluid communication with, and disposed before the one or more pre-separation gas application units or the compressor.

14. The method of claim 1, further comprising a carbon dioxide removal apparatus capable of substantially removing carbon dioxide from the dry gas to form a treated dry gas, wherein the carbon dioxide removal apparatus is in fluid communication with, and disposed between the separation subsystem and the one or more dry gas application units.

15. The method of claim 1, further comprising a carbon dioxide removal apparatus capable of substantially removing carbon dioxide from the blended gas to form a treated blended gas, wherein the carbon dioxide removal apparatus is in fluid communication with, and disposed between the separation subsystem or second blending subsystem mixing valves and the one or more wet gas application units.

16. The method of claim 1, further comprising a primary flow control of the control subsystem regulating flow to one or more of:
   a first downstream compressor disposed before the one or more pre-separation gas application units or within lines transporting removed constituents;
   a second downstream compressor disposed before the one or more dry gas application units;
   a third downstream compressor disposed before the one or more wet gas application units or auxiliary applications; and
   based on flow rate or supply of gas measured by one or more of: the at least one feedback component, the at least one monitoring component, or the at least one sensing component.

17. The method of claim 1, wherein the NGL and wet gas subsystem fourth controller adjusts system parameters and flow rate according to one or more of: fuel flow demand of the one or more wet gas application units, measured pressure of the blended gas, heat range and/or heating value of a gas stream of the one or more wet gas application units, or gas constituent composition of the blended gas, conducted in real-time, on-demand, based on measurements by the at least one sensing component.

18. The method of claim 1, wherein the at least one sensing component of the NGL and wet gas subsystem comprises at least one of a pressure sensor, a gas flow meter, a flame ionization detector (FID), an infrared composition sensor, gas chromatography instrument, or a non-methane hydrocarbon detector disposed in a fluid circuit, used to measure heating value of at least the blended gas.

19. The method of claim 1, wherein the control subsystem operates a computer processor, memory, electronic communications network, control signals and an application and/or control logic that automatically controls flow and directs fluids and/or gases in real time using valves and components to meet one or more of: flow demand, predetermined thresholds, predetermined specifications, and predetermined system parameters, wherein the control signals adjust system parameters including one or more of:
   increasing flow from the first blending subsystem to the separating subsystem;
   decreasing flow from the first blending subsystem to the separating subsystem and increasing flow to the one or more pre-separation application units;
   increasing flow from the second blending subsystem to natural gas liquid (NGL) and wet gas subsystem;
   decreasing flow from the second blending subsystem to natural gas liquid (NGL) and wet gas subsystem;
   increasing flow to one or more of: the one or more pre-separation application units, the one or more dry gas application units, or the one or more wet gas application units, in response to a decrease in pressure from a pressure sensor below a minimum pressure threshold when those application units are ramping up to meet increased power demand;
   decreasing flow to the one or more of: the one or more pre-separation application units, the one or more dry gas application units, or the one or more wet gas application units, in response to an increase in pressure from a pressure sensor above a maximum pressure threshold when those application units are ramping down to meet decreased power demand;
   decreasing flow to the one or more of: the one or more pre-separation application units, the one or more dry gas application units, or the one or more wet gas application units, in response to maintain pressure;
   increasing flow to units of the application product system in response to an increase in power demand;
   increasing/decreasing flow of the blended gas in response to the one or more application units ramping down for a decrease in power demand; and
   increasing/decreasing flow of the blended gas in response to the one or more application units ramping down for a decrease in power demand.

20. The method of claim 1, wherein the one or more pre-separation application units of the first blending subsystem comprise one or more power units further comprising one or more of turbines, micro-turbines, multi-fuel micro-turbines, reciprocating engines, gas fueled engines, compressed natural gas fueled engines configured to operate using dual fuel, compressed natural gas, or natural gas comprising methane and non-methane hydrocarbons in a predetermined composition or ratio, and the one or more pre-separation application units are operatively coupled or fastened to a generator.

21. The method of claim 1, wherein the one or more dry gas application units of the dry produced gas subsystem comprise one or more power units further comprising one or more of turbines, micro-turbines, multi-fuel micro-turbines, reciprocating engines, gas fueled engines, compressed natural gas fueled engines configured to operate using dual fuel, compressed natural gas, or natural gas comprising methane and non-methane hydrocarbons in a predetermined composition or ratio, and the one or more pre-separation application units are operatively coupled or fastened to a generator.

22. The method of claim 1, wherein the one or more wet gas application units of the NGL and wet gas subsystem comprise one or more power units further comprising one or more of turbines, micro-turbines, multi-fuel micro-turbines, reciprocating engines, gas fueled engines, compressed natural gas fueled engines configured to operate using dual fuel, compressed natural gas, or natural gas comprising methane and non-methane hydrocarbons in a predetermined composition or ratio, and the one or more pre-separation application units are operatively coupled or fastened to a generator.

23. The method of claim 1, wherein the NGL and wet gas subsystem directs blended gas to one or more wet gas application units using a fourth controller in communication with a sensing component positioned at or before a fuel gas inlet for the one or more wet gas application units to form a fourth closed loop of the control subsystem, wherein the fourth controller adjusts system parameters to vary blended gas flow in real-time, on-demand, based on measurements by the at least one sensing component.

24. The method of claim 1, wherein the application unit product subsystem directs unit products produced by one or more of: the one or more pre-separation applications units, the one or more dry gas applications units, the one or more NGL and wet gas applications units.

25. The method of claim 1, wherein the application unit product subsystem comprises a gas outlet to an NGL pipeline, flare or trailer NGL.

26. The method of claim 1, wherein the application unit product subsystem comprises electrically connected to a generator, transmitting or storing produced electricity used onsite or transmitted to satisfy exterior demand.

27. The method of claim 1, wherein the application unit product subsystem comprises an exhaust heat ventilation unit and conduits transmitting exhaust heat to combined heat and power applications, NGLs heat, facilities, onsite applications.

28. A conversion system for managing variable, multiphase fluid conversion to output fuel and energy, the conversion system comprising:
a gas conditioning subsystem receiving a flow of input gas from a gas source input gas stream of varying composition comprising methane and non-methane hydrocarbons;
conditioning components of the gas conditioning subsystem configured to convert the input gas into conditioned gas and a compressor subsystem comprising a compressor configured for adjusting pressure of the conditioned gas;
a conversion system control subsystem comprising multiple automatically controlled closed loops managed by the control subsystem to direct fluids and/or gas flow, further comprising a first closed loop wherein a first controller adjusts system parameters to vary conditioned gas flow based on measurements by at least one measurement component;
a first blending subsystem in fluid communication with the conditioning subsystem, comprising a diverting valve subsystem directing the conditioned gas into one or more pre-separation application units and/or a separation subsystem, and a second controller in communication with at least one feedback component positioned at or before a gas inlet for the one or more pre-separation gas application units to form a second closed loop of the control subsystem, wherein the second controller adjusts system parameters to vary conditioned gas flow based on measurements by the at least one feedback component;
a separation subsystem comprising a Joule-Thomson (JT) apparatus in fluid communication with the first blending subsystem to receive a conditioned gas stream, separating at least a portion of the conditioned gas using a thermal management subsystem in fluid communication with the JT apparatus to condense heavier hydrocarbons out of the conditioned gas stream, to produce (a) a condensed liquid comprising primarily non-methane hydrocarbons, and (b) a converted gas comprising primarily methane and lessor amounts of non-methane hydrocarbons;
a dry produced gas subsystem in fluid communication with the separation subsystem, comprising one or more dry gas application units using a third controller in communication with a monitoring component positioned at or before a fuel gas inlet for the one or more dry gas application units to form a third closed loop of the control subsystem, wherein the third controller adjusts system parameters to vary dry gas flow in real-time, on-demand, based on measurements by the at least one monitoring component;
a second blending subsystem in fluid communication with the dry gas subsystem and comprising one or more mixing valve subsystems and/or waste gates controlling production rate of the blended gas comprising converted gas from the condensed liquid mixed with the dry gas stream within threshold limits of a predetermined enrichment ratio to match fuel flow demand of one or more wet gas application units by adjusting the flow rate of a dry gas stream;
a natural gas liquid (NGL) and wet gas subsystem in fluid communication with the separation subsystem and the second blending subsystem, directing blended gas to the one or more wet gas application units using a fourth controller in communication with a sensing component, wherein the fourth controller adjusts system parameters to vary blended gas flow in real-time, on-demand, based on measurements by the at least one sensing component; and
a set of conduits and or pipes interconnecting subsystems in fluid communication and an application unit product subsystem receiving unit products and delivering unit products to output destinations according to system parameters, wherein the control subsystem automatically controls flow and directs fluids/gases in real time using valves and components to meet one or more of: flow demand, predetermined thresholds, predetermined specifications, and predetermined system parameters.

29. The system of claim 28, wherein the input gas is associated gas and wherein the associated gas stream contains methane and non-methane hydrocarbons.

30. The system of claim 28, wherein gas conditioning subsystem comprises one or more conditioning components performing one or more conditioning operations comprising one or more of: additional gas compression or pressure adjustment, hydrogen sulfide ($H_2S$) removal, nitrogen separation, carbon dioxide ($CO_2$) removal or water removal, liquid natural gas (LNG) or hydrogen adjustment, wherein removed constituents comprising one or more of $H_2S$, nitrogen $CO_2$, hydrogen, LNG or water are diverted for further storage or processing.

31. The system of claim 28, wherein portions of removed constituents and conditioned gas of the first blending subsystem are selectively added or blended back into gas streams supplying one or more of the one or more dry gas application units, the one or more wet gas application units, or the one or more pre-separation gas application units, using valves and components to meet one or more of: flow demand, predetermined thresholds, predetermined specifications, and predetermined system parameters.

32. The system of claim 28, wherein the first blending subsystem receives the conditioned gas from the gas conditioning system in fluid communication with the first blending subsystem and increases or decreases conditioned gas flow to manage heat range and gas constituents/ratios according to predetermined unit specifications, using a diverting valve subsystem to control flow and divert gas unusable or excess of unit specifications to the separation subsystem.

33. The system of claim 28, wherein the second controller of the first blending subsystem adjusts system parameters to vary conditioned gas flow based on measurements by the at least one feedback component according to one or more of: fuel flow demand of the one or more pre-separation gas application units, measured pressure of the conditioned gas, heat range and/or heating value of a gas stream of the one or more pre-separation gas application units, or constituent composition of the conditioned gas, conducted in real-time, on-demand, based on measurements by the at least one feedback component.

34. The system of claim 28, wherein the at least one feedback component of the first blending subsystem comprises at least one of a pressure sensor, a gas flow meter, a flame ionization detector (FID), an infrared composition sensor, gas chromatography instrument, or a non-methane hydrocarbon detector disposed in a fluid circuit, used to measure heating value of at least the conditioned gas.

35. The system of claim 28, wherein the dry produced gas subsystem third controller adjusts system parameters and flow rate according to one or more of: fuel flow demand of the one or more dry gas application units, measured pressure of the dry gas, heat range and/or heating value of a gas stream of the one or more dry gas application units, or gas constituent composition of the dry gas, conducted in real-time, on-demand, based on measurements by the at least one monitoring component.

36. The system of claim 28, wherein the at least one monitoring component of the dry produced gas subsystem comprises at least one of a pressure sensor, a gas flow meter, a flame ionization detector (FID), an infrared composition sensor, gas chromatography instrument, or a non-methane hydrocarbon detector disposed in a fluid circuit, used to measure heating value of at least the dry gas.

37. The system of claim 28, wherein the condensed liquid stream is vaporized using a vaporizing apparatus configured to receive the condensed liquid and convert the condensed liquid to gaseous form converted gas prior to entering the second blending subsystem or receiving dry gas supply at the mixing valve subsystem.

38. The system of claim 28, wherein inside the second blending subsystem the dry gas stream, comprising a portion of the dry gas diverted from being delivered to the one or more dry gas application units, is mixed with one or more of NGLs, condensed liquid in gaseous form or converted gas.

39. The system of claim 28, further comprising the conditioned gas flowing through a dehydrator to remove water or other liquids from the conditioned gas to form a conditioned gas suitable for compression.

40. The system of claim 28, further comprising a carbon dioxide removal apparatus capable of substantially removing carbon dioxide from the conditioned gas to form a conditioned gas, wherein the carbon dioxide removal apparatus is in fluid communication with, and disposed before the one or more pre-separation gas application units or the compressor.

41. The system of claim 28, further comprising a carbon dioxide removal apparatus capable of substantially removing carbon dioxide from the dry gas to form a treated dry gas, wherein the carbon dioxide removal apparatus is in fluid communication with, and disposed between the separation subsystem and the one or more dry gas application units.

42. The system of claim 28, further comprising a carbon dioxide removal apparatus capable of substantially removing carbon dioxide from the blended gas to form a treated blended gas, wherein the carbon dioxide removal apparatus is in fluid communication with, and disposed between the separation subsystem or second blending subsystem mixing valves and the one or more wet gas application units.

43. The system of claim 28, further comprising a primary flow control of the control subsystem regulating flow to one or more of:
a first downstream compressor disposed before the one or more pre-separation gas application units or within lines transporting removed constituents;
a second downstream compressor disposed before the one or more dry gas application units;
a third downstream compressor disposed before the one or more wet gas application units or auxiliary applications; and
based on flow rate or supply of gas measured by one or more of: the at least one feedback component, the at least one monitoring component, or the at least one sensing component.

44. The system of claim 28, wherein the NGL and wet gas subsystem fourth controller adjusts system parameters and flow rate according to one or more of: fuel flow demand of the one or more wet gas application units, measured pressure of the blended gas, heat range and/or heating value of a gas stream of the one or more wet gas application units, or gas constituent composition of the blended gas, conducted in real-time, on-demand, based on measurements by the at least one sensing component.

45. The system of claim 28, wherein the at least one sensing component of the NGL and wet gas subsystem comprises at least one of a pressure sensor, a gas flow meter, a flame ionization detector (FID), an infrared composition sensor, gas chromatography instrument, or a non-methane hydrocarbon detector disposed in a fluid circuit, used to measure heating value of at least the blended gas.

46. The system of claim 28, wherein the control subsystem operates a computer processor, memory, electronic communications network, control signals and an application and/or control logic that automatically controls flow and directs fluids and/or gases in real time using valves and components to meet one or more of: flow demand, predetermined thresholds, predetermined specifications, and predetermined system parameters, wherein the control signals adjust system parameters including one or more of:
increasing flow from the first blending subsystem to the separating subsystem;
decreasing flow from the first blending subsystem to the separating subsystem and increasing flow to the one or more pre-separation application units;
increasing flow from the second blending subsystem to natural gas liquid (NGL) and wet gas subsystem;
decreasing flow from the second blending subsystem to natural gas liquid (NGL) and wet gas subsystem;
increasing flow to one or more of: the one or more pre-separation application units, the one or more dry gas application units, or the one or more wet gas application units, in response to a decrease in pressure from a pressure sensor below a minimum pressure threshold when those application units are ramping up to meet increased power demand;
decreasing flow to the one or more of: the one or more pre-separation application units, the one or more dry gas application units, or the one or more wet gas application units, in response to an increase in pressure from a pressure sensor above a maximum pressure threshold when those application units are ramping down to meet decreased power demand;
decreasing flow to the one or more of: the one or more pre-separation application units, the one or more dry gas application units, or the one or more wet gas application units, in response to maintain pressure;
increasing flow to units of the application product system in response to an increase in power demand;
increasing/decreasing flow of the blended gas in response to the one or more application units ramping down for a decrease in power demand; and
increasing/decreasing flow of the blended gas in response to the one or more application units ramping down for a decrease in power demand.

47. The system of claim 28, wherein the one or more pre-separation application units of the first blending subsystem comprise one or more power units further comprising one or more of turbines, micro-turbines, multi-fuel micro-turbines, reciprocating engines, gas fueled engines, compressed natural gas fueled engines configured to operate using dual fuel, compressed natural gas, or natural gas comprising methane and non-methane hydrocarbons in a predetermined composition or ratio, and the one or more pre-separation application units are operatively coupled or fastened to a generator.

48. The system of claim 28, wherein the one or more dry gas application units of the dry produced gas subsystem comprise one or more power units further comprising one or more of turbines, micro-turbines, multi-fuel micro-turbines, reciprocating engines, gas fueled engines, compressed natural gas fueled engines configured to operate using dual fuel, compressed natural gas, or natural gas comprising methane and non-methane hydrocarbons in a predetermined composition or ratio, and the one or more pre-separation application units are operatively coupled or fastened to a generator.

49. The system of claim 28, wherein the one or more wet gas application units of the NGL and wet gas subsystem comprise one or more power units further comprising one or more of turbines, micro-turbines, multi-fuel micro-turbines, reciprocating engines, gas fueled engines, compressed natural gas fueled engines configured to operate using dual fuel, compressed natural gas, or natural gas comprising methane and non-methane hydrocarbons in a predetermined composition or ratio, and the one or more pre-separation application units are operatively coupled or fastened to a generator.

50. The system of claim 28, wherein the NGL and wet gas subsystem directs blended gas to one or more wet gas application units using a fourth controller in communication with a sensing component positioned at or before a fuel gas inlet for the one or more wet gas application units to form a fourth closed loop of the control subsystem, wherein the fourth controller adjusts system parameters to vary blended gas flow in real-time, on-demand, based on measurements by the at least one sensing component.

51. The system of claim 28, wherein the application unit product subsystem directs unit products produced by one or more of: the one or more pre-separation applications units, the one or more dry gas applications units, the one or more NGL and wet gas applications units.

52. The system of claim 28, wherein the application unit product subsystem comprises a gas outlet to an NGL pipeline, flare or trailer NGL.

53. The system of claim 28, wherein the application unit product subsystem comprises electrically connected to a generator, transmitting or storing produced electricity used onsite or transmitted to satisfy exterior demand.

54. The system of claim 28, wherein the application unit product subsystem comprises an exhaust heat ventilation unit and conduits transmitting exhaust heat to combined heat and power applications, NGLs heat, facilities, onsite applications.

* * * * *